(12) United States Patent
Hoffberg

(10) Patent No.: US 9,045,927 B1
(45) Date of Patent: Jun. 2, 2015

(54) INTELLIGENT DOOR RESTRAINT

(71) Applicant: Steven M. Hoffberg, West Harrison, NY (US)

(72) Inventor: Steven M. Hoffberg, West Harrison, NY (US)

(*) Notice: Subject to any disclaimer, the term of this patent is extended or adjusted under 35 U.S.C. 154(b) by 0 days.

(21) Appl. No.: 13/956,558

(22) Filed: Aug. 1, 2013

Related U.S. Application Data

(63) Continuation of application No. 13/542,733, filed on Jul. 6, 2012, which is a continuation of application No. 11/290,168, filed on Nov. 30, 2005, now Pat. No. 8,225,458, which is a continuation of application No. 10/196,684, filed on Jul. 15, 2002, now abandoned.

(60) Provisional application No. 60/305,130, filed on Jul. 13, 2001.

(51) Int. Cl.
*E05F 3/00* (2006.01)
*E05F 15/00* (2006.01)

(52) U.S. Cl.
CPC .................................. *E05F 15/0021* (2013.01)

(58) Field of Classification Search
USPC ............................................................ 16/49
See application file for complete search history.

(56) References Cited

U.S. PATENT DOCUMENTS

| | | | |
|---|---|---|---|
| 3,574,886 A | 4/1971 | Solovieff |
| 3,595,177 A | 7/1971 | Bennett et al. |
| 3,624,864 A | 12/1971 | Marr |
| 3,668,737 A | 6/1972 | Tillmann |
| 3,675,270 A | 7/1972 | Jentsch |
| 3,699,608 A | 10/1972 | Schwarz |
| 3,714,677 A | 2/1973 | Schmid |
| 3,724,023 A | 4/1973 | Tillmann |
| 3,771,195 A | 11/1973 | Tansley |
| 3,776,611 A | 12/1973 | Jentsch |
| 3,787,924 A | 1/1974 | Jentsch |
| 3,822,438 A | 7/1974 | Takenaka |
| 3,852,846 A | 12/1974 | Slaybaugh |
| 3,874,117 A | 4/1975 | Boehm |
| 3,875,612 A | 4/1975 | Poitras |
| 3,934,306 A | 1/1976 | Farris |
| 3,934,307 A | 1/1976 | Lasier et al. |
| 3,935,614 A | 2/1976 | Pannone et al. |
| 3,936,977 A | 2/1976 | Runft et al. |
| 3,948,000 A | 4/1976 | Pedersen |

(Continued)

FOREIGN PATENT DOCUMENTS

| | | |
|---|---|---|
| AU | 1679488 | 1/1989 |
| AU | 1808888 | 1/1989 |

(Continued)

*Primary Examiner* — Mark Williams
(74) *Attorney, Agent, or Firm* — Steven M. Hoffberg; Ostrolenk Faber LLP

(57) ABSTRACT

A method for controlling a door, comprising the steps of storing energy during a manual opening of a door, sensing an object within a doorway, selectively applying a force derived from the stored energy, to close the door, based on the sensing of an object in the doorway. The closure is preferably controlled by an electronic control. A door closing device comprising an energy storage device for storing energy during door opening and releasing the stored energy to subsequently close the door, a damping system for damping a closure of the door, a sensor for detecting an object within a doorway, having an output, a controllable device for selectively restraining the energy storage device from closing the door, and a control system for controlling the controllable device based on the output.

17 Claims, 12 Drawing Sheets

(56) References Cited

U.S. PATENT DOCUMENTS

| | | |
|---|---|---|
| 3,966,289 A | 6/1976 | Schlage |
| 3,989,286 A | 11/1976 | Cleff |
| 4,010,572 A | 3/1977 | Peterson |
| 4,016,381 A | 4/1977 | Rodseth |
| 4,019,220 A | 4/1977 | Lieberman |
| 4,034,437 A | 7/1977 | Robertson et al. |
| 4,040,144 A | 8/1977 | Lasier et al. |
| 4,045,914 A | 9/1977 | Catlett |
| 4,048,694 A | 9/1977 | Newman et al. |
| 4,050,114 A | 9/1977 | Zunkel |
| 4,054,008 A | 10/1977 | Phillips |
| 4,064,589 A | 12/1977 | Bejarano et al. |
| 4,067,084 A | 1/1978 | Tillmann |
| 4,069,544 A | 1/1978 | D'Hooge |
| 4,069,546 A | 1/1978 | Reichlin |
| 4,075,734 A | 2/1978 | Nagase |
| 4,079,479 A | 3/1978 | Clement |
| 4,080,687 A | 3/1978 | Jentsch |
| 4,083,080 A | 4/1978 | Miyazawa |
| 4,097,956 A | 7/1978 | Kitutaka |
| 4,102,005 A | 7/1978 | Schnarr et al. |
| 4,102,006 A | 7/1978 | Jenkins |
| 4,103,392 A | 8/1978 | MacDonald |
| 4,112,127 A | 9/1978 | Popeil |
| 4,115,897 A | 9/1978 | Zunkel |
| 4,121,319 A | 10/1978 | Welch |
| 4,130,913 A | 12/1978 | Rodseth |
| 4,139,182 A | 2/1979 | Nagase et al. |
| 4,146,405 A | 3/1979 | Timmer et al. |
| 4,148,111 A | 4/1979 | Lieberman |
| 4,151,380 A | 4/1979 | Blomeyer et al. |
| 4,155,144 A | 5/1979 | Koganei |
| 4,155,199 A | 5/1979 | Rubertus |
| 4,160,304 A | 7/1979 | Smith et al. |
| 4,161,183 A | 7/1979 | Berry |
| 4,161,804 A | 7/1979 | D'Hooge et al. |
| 4,179,092 A | 12/1979 | Miyazawa |
| 4,185,356 A | 1/1980 | Kuivalainen et al. |
| 4,220,051 A | 9/1980 | Catlett |
| 4,222,147 A | 9/1980 | Burnett, Jr. |
| 4,232,798 A | 11/1980 | Hammel et al. |
| 4,234,996 A | 11/1980 | Jentsch |
| 4,237,578 A | 12/1980 | Welch |
| 4,254,308 A | 3/1981 | Blomeyer et al. |
| 4,263,694 A | 4/1981 | Jentsch |
| 4,267,619 A | 5/1981 | Suska |
| 4,285,094 A | 8/1981 | Levings, Jr. |
| 4,286,411 A | 9/1981 | Wikkerink et al. |
| 4,287,639 A | 9/1981 | Denton |
| 4,289,995 A | 9/1981 | Sorber et al. |
| 4,290,161 A | 9/1981 | Fishering et al. |
| 4,298,140 A | 11/1981 | Owens |
| 4,317,254 A | 3/1982 | Chaddock |
| 4,339,843 A | 7/1982 | Burnett, Jr. |
| 4,348,835 A | 9/1982 | Jones et al. |
| 4,349,939 A | 9/1982 | Tillmann |
| 4,357,732 A | 11/1982 | Hickman |
| 4,358,870 A | 11/1982 | Hong |
| 4,365,442 A | 12/1982 | Speer |
| 4,366,595 A | 1/1983 | Elliott |
| 4,371,201 A | 2/1983 | Stock et al. |
| 4,375,735 A | 3/1983 | Rhoads |
| 4,376,323 A | 3/1983 | Tillmann |
| 4,378,612 A | 4/1983 | Beers |
| 4,386,446 A | 6/1983 | Zunkel et al. |
| 4,387,482 A | 6/1983 | Maublanc |
| 4,394,787 A | 7/1983 | Lieberman |
| 4,401,346 A | 8/1983 | Jones et al. |
| 4,414,703 A | 11/1983 | Schnarr et al. |
| 4,419,786 A | 12/1983 | Surko, Jr. |
| 4,419,787 A | 12/1983 | Lieberman |
| 4,429,490 A | 2/1984 | Zunkel |
| 4,438,835 A | 3/1984 | Dowden et al. |
| 4,455,708 A | 6/1984 | Saigne |
| 4,460,030 A | 7/1984 | Tsunemura et al. |
| 4,483,043 A | 11/1984 | Tillmann |
| 4,483,044 A | 11/1984 | Johnston et al. |
| 4,485,522 A | 12/1984 | Chen |
| 4,486,917 A | 12/1984 | Johnston et al. |
| 4,498,112 A | 2/1985 | Georgens et al. |
| 4,501,090 A | 2/1985 | Yoshida et al. |
| 4,502,180 A | 3/1985 | Harrison et al. |
| 4,506,407 A | 3/1985 | Downey |
| 4,513,953 A | 4/1985 | Molders et al. |
| 4,534,278 A | 8/1985 | Spilde |
| 4,561,343 A | 12/1985 | Mummert |
| 4,573,238 A | 3/1986 | Phillips |
| 4,575,880 A | 3/1986 | Burgess |
| 4,580,365 A | 4/1986 | Sieg |
| 4,583,324 A | 4/1986 | Storz et al. |
| 4,593,584 A | 6/1986 | Neves |
| 4,639,969 A | 2/1987 | Obenshain |
| 4,648,151 A | 3/1987 | Whaley |
| 4,649,598 A | 3/1987 | Kinsey et al. |
| 4,653,229 A | 3/1987 | Feucht et al. |
| 4,656,690 A | 4/1987 | Katagiri et al. |
| 4,658,545 A | 4/1987 | Ingham et al. |
| 4,660,250 A | 4/1987 | Tillman et al. |
| 4,663,800 A | 5/1987 | Mettenleiter et al. |
| 4,663,887 A | 5/1987 | Storandt et al. |
| 4,665,583 A | 5/1987 | Frolov et al. |
| 4,665,584 A | 5/1987 | Williams |
| 4,669,147 A | 6/1987 | Suchanek |
| 4,686,739 A | 8/1987 | Fritsche et al. |
| 4,707,882 A | 11/1987 | Watts |
| 4,709,445 A | 12/1987 | Waldo et al. |
| 4,715,146 A | 12/1987 | Atsumi et al. |
| 4,721,946 A | 1/1988 | Zunkel |
| 4,722,116 A | 2/1988 | Erickson |
| 4,744,125 A | 5/1988 | Scheck et al. |
| 4,750,236 A | 6/1988 | Teague, Jr. |
| 4,754,522 A | 7/1988 | Hucknall |
| 4,756,051 A | 7/1988 | Shy |
| 4,763,111 A | 8/1988 | Matsuo et al. |
| 4,763,385 A | 8/1988 | Furch et al. |
| 4,782,333 A | 11/1988 | Merchant |
| 4,783,882 A | 11/1988 | Frolov |
| 4,788,742 A | 12/1988 | Edgett et al. |
| 4,791,414 A | 12/1988 | Griess |
| 4,793,023 A | 12/1988 | Simpson et al. |
| 4,803,754 A | 2/1989 | Roberts |
| 4,821,521 A | 4/1989 | Schuler |
| 4,835,905 A | 6/1989 | Lasier et al. |
| 4,844,567 A | 7/1989 | Chalabian |
| 4,845,811 A | 7/1989 | Fargnier |
| 4,876,764 A | 10/1989 | Teague, Jr. |
| 4,878,265 A | 11/1989 | Nesbitt |
| 4,884,369 A | 12/1989 | Tatham |
| 4,894,883 A | 1/1990 | Fleischhauer |
| 4,916,267 A | 4/1990 | Lasier et al. |
| 4,935,989 A | 6/1990 | Miller |
| 4,937,913 A | 7/1990 | Jentsch |
| 4,937,914 A | 7/1990 | Harrison et al. |
| 4,944,066 A | 7/1990 | Fayngersh et al. |
| 4,953,260 A | 9/1990 | Fargnier |
| 4,955,194 A | 9/1990 | Christensen et al. |
| 4,958,144 A | 9/1990 | Griess |
| 4,967,444 A | 11/1990 | Korling et al. |
| 4,973,894 A | 11/1990 | Johansson |
| 4,979,261 A | 12/1990 | Lasier et al. |
| 4,995,194 A | 2/1991 | Schultze et al. |
| 4,997,527 A | 3/1991 | Kress et al. |
| 4,999,872 A | 3/1991 | Jentsch |
| 5,001,809 A | 3/1991 | Kim et al. |
| 5,002,331 A | 3/1991 | Frye et al. |
| 5,004,148 A | 4/1991 | Windrem |
| 5,005,881 A | 4/1991 | Bailey et al. |
| 5,012,608 A | 5/1991 | Brown |
| 5,016,317 A | 5/1991 | Hung |
| 5,020,189 A | 6/1991 | Grome et al. |
| 5,027,473 A | 7/1991 | Hottmann |
| 5,027,553 A | 7/1991 | Vergara |
| 5,033,234 A | 7/1991 | Simon et al. |
| 5,046,283 A | 9/1991 | Compeau et al. |

(56) References Cited

U.S. PATENT DOCUMENTS

| | | |
|---|---|---|
| 5,048,151 A | 9/1991 | Orii et al. |
| 5,083,342 A | 1/1992 | Klinefelter |
| 5,090,089 A | 2/1992 | Schulte et al. |
| 5,131,188 A | 7/1992 | Hutchison et al. |
| 5,135,083 A | 8/1992 | Hayashi et al. |
| 5,138,795 A | 8/1992 | Compeau et al. |
| 5,190,617 A | 3/1993 | Kress et al. |
| 5,191,678 A | 3/1993 | Firari |
| 5,192,398 A | 3/1993 | Kress et al. |
| 5,206,971 A | 5/1993 | Schmelzer et al. |
| 5,216,418 A | 6/1993 | Lenz et al. |
| 5,219,372 A | 6/1993 | Lee |
| 5,224,677 A | 7/1993 | Close |
| 5,239,778 A | 8/1993 | Towler |
| 5,246,258 A | 9/1993 | Kerschenbaum et al. |
| 5,251,400 A | 10/1993 | Schultze |
| 5,253,782 A | 10/1993 | Gates et al. |
| 5,254,040 A | 10/1993 | Eller et al. |
| 5,259,090 A | 11/1993 | Fayngersh |
| 5,265,306 A | 11/1993 | Yu |
| 5,272,787 A | 12/1993 | Salena et al. |
| 5,291,630 A | 3/1994 | Brown |
| 5,309,676 A | 5/1994 | Appelmann et al. |
| 5,343,593 A | 9/1994 | Fayngersh |
| 5,375,861 A | 12/1994 | Gifford |
| 5,379,033 A | 1/1995 | Fujii et al. |
| 5,382,016 A | 1/1995 | Kobayashi et al. |
| 5,386,614 A | 2/1995 | Fayngersh |
| 5,386,885 A | 2/1995 | Bunzl et al. |
| 5,392,562 A | 2/1995 | Carambula |
| 5,414,894 A | 5/1995 | Fayngersh |
| 5,417,013 A | 5/1995 | Tillmann |
| 5,437,079 A | 8/1995 | Park |
| 5,471,708 A | 12/1995 | Lynch |
| 5,477,589 A | 12/1995 | Lan |
| 5,487,206 A | 1/1996 | Brown et al. |
| 5,488,896 A | 2/1996 | Current |
| 5,497,533 A | 3/1996 | Karlsen |
| 5,502,874 A | 4/1996 | Lucas |
| 5,507,120 A | 4/1996 | Current |
| 5,510,686 A | 4/1996 | Collier |
| 5,511,284 A | 4/1996 | Current |
| 5,513,467 A | 5/1996 | Current et al. |
| 5,513,469 A | 5/1996 | Tajudeen et al. |
| 5,515,649 A | 5/1996 | Strab |
| 5,517,719 A | 5/1996 | Christ |
| 5,519,988 A | 5/1996 | Copley et al. |
| 5,525,963 A | 6/1996 | Purssey |
| 5,529,148 A | 6/1996 | O'Leary |
| 5,535,514 A | 7/1996 | Lucas |
| 5,542,216 A | 8/1996 | Mohler |
| 5,553,353 A | 9/1996 | Lin |
| 5,553,521 A | 9/1996 | Dunn |
| 5,572,768 A | 11/1996 | Daul |
| 5,579,607 A | 12/1996 | Braid |
| 5,592,780 A | 1/1997 | Checkovich |
| 5,592,902 A | 1/1997 | Horton |
| 5,630,248 A | 5/1997 | Luca |
| 5,638,639 A | 6/1997 | Goodman et al. |
| 5,651,216 A | 7/1997 | Tillmann |
| 5,651,536 A | 7/1997 | Daul |
| 5,657,511 A | 8/1997 | Lan |
| 5,659,925 A | 8/1997 | Patterson |
| 5,666,692 A | 9/1997 | Toledo |
| 5,673,175 A | 9/1997 | Carney et al. |
| 5,676,459 A | 10/1997 | Bedford et al. |
| 5,680,674 A | 10/1997 | Guthrie |
| 5,681,140 A | 10/1997 | Christenson |
| 5,687,451 A | 11/1997 | Singer |
| 5,687,507 A | 11/1997 | Beran |
| 5,706,551 A | 1/1998 | Jeynes et al. |
| 5,706,765 A | 1/1998 | Horton |
| 5,709,009 A | 1/1998 | Lasson et al. |
| 5,722,203 A | 3/1998 | Staples et al. |
| 5,727,286 A | 3/1998 | Shen |
| 5,727,348 A | 3/1998 | Arnell et al. |
| 5,732,508 A | 3/1998 | Latta et al. |
| 5,741,034 A | 4/1998 | Bains et al. |
| 5,749,122 A | 5/1998 | Herbst |
| 5,752,343 A | 5/1998 | Quintus |
| 5,771,635 A | 6/1998 | Skinner |
| 5,789,887 A | 8/1998 | Elischewski |
| 5,802,670 A | 9/1998 | Bienek |
| 5,804,931 A | 9/1998 | Schack |
| 5,806,246 A | 9/1998 | Azuma |
| 5,809,697 A | 9/1998 | Chen |
| 5,813,282 A | 9/1998 | Azuma |
| 5,813,739 A | 9/1998 | White |
| 5,829,097 A | 11/1998 | Toledo |
| 5,829,098 A | 11/1998 | Alonso |
| 5,829,508 A | 11/1998 | DeBower et al. |
| 5,832,561 A | 11/1998 | Bienek |
| 5,832,562 A | 11/1998 | Luca |
| 5,845,360 A | 12/1998 | Lantzy |
| 5,850,671 A | 12/1998 | Kaser |
| 5,855,039 A | 1/1999 | Crawford |
| 5,862,569 A | 1/1999 | Wood |
| 5,862,630 A | 1/1999 | Krumhauer et al. |
| 5,864,920 A | 2/1999 | Lasson et al. |
| 5,864,987 A | 2/1999 | Mariel et al. |
| 5,867,866 A | 2/1999 | Chen et al. |
| 5,878,530 A | 3/1999 | Eccleston et al. |
| 5,899,169 A | 5/1999 | Jenson |
| 5,901,412 A | 5/1999 | Jentsch |
| 5,901,992 A | 5/1999 | Winkler |
| 5,910,075 A | 6/1999 | Arnell et al. |
| 5,913,763 A | 6/1999 | Beran et al. |
| 5,927,766 A | 7/1999 | Rosen |
| 5,943,736 A | 8/1999 | Karkkainen et al. |
| 5,944,367 A | 8/1999 | Imaizumi et al. |
| 5,946,858 A | 9/1999 | Staser |
| 5,951,069 A | 9/1999 | Kobayashi et al. |
| 5,953,789 A | 9/1999 | Alonso |
| 5,956,249 A * | 9/1999 | Beran et al. .................... 700/56 |
| 5,956,806 A | 9/1999 | Tutikawa |
| 5,971,514 A | 10/1999 | Hayakawa |
| 5,992,444 A | 11/1999 | Junttila |
| 6,002,217 A | 12/1999 | Stevens et al. |
| 6,003,568 A | 12/1999 | Strnad, Jr. |
| 6,011,468 A | 1/2000 | Lee |
| 6,024,137 A | 2/2000 | Strnad et al. |
| 6,029,403 A | 2/2000 | Bertolini et al. |
| 6,032,330 A | 3/2000 | Chen |
| 6,032,331 A | 3/2000 | Alonso |
| 6,047,440 A | 4/2000 | Jensen et al. |
| 6,049,287 A | 4/2000 | Yulkowski |
| 6,049,444 A | 4/2000 | Iftikar et al. |
| 6,050,117 A | 4/2000 | Weyerstall |
| 6,061,964 A | 5/2000 | Arnell et al. |
| 6,065,184 A | 5/2000 | Drury |
| 6,079,162 A | 6/2000 | Hein |
| 6,092,334 A | 7/2000 | Kim |
| 6,112,368 A | 9/2000 | Luckett |
| 6,125,505 A | 10/2000 | Jensen et al. |
| 6,131,967 A | 10/2000 | Kondo et al. |
| 6,138,412 A | 10/2000 | Rieckmann et al. |
| 6,145,942 A | 11/2000 | Borgen |
| 6,151,753 A | 11/2000 | Salutzki |
| 6,154,924 A | 12/2000 | Woo |
| 6,164,685 A | 12/2000 | Fischer et al. |
| 6,167,589 B1 | 1/2001 | Luedtke |
| 6,178,698 B1 | 1/2001 | Benson et al. |
| 6,179,187 B1 | 1/2001 | Lemire et al. |
| 6,185,868 B1 | 2/2001 | Kato |
| 6,199,222 B1 | 3/2001 | Tagg |
| 6,199,322 B1 | 3/2001 | Itami et al. |
| 6,205,615 B1 | 3/2001 | Jensen et al. |
| 6,209,431 B1 | 4/2001 | Wickham |
| 6,223,469 B1 | 5/2001 | Moll |
| 6,227,508 B1 | 5/2001 | Panzarella et al. |
| 6,234,520 B1 | 5/2001 | Breed et al. |
| 6,237,647 B1 | 5/2001 | Pong et al. |
| 6,240,598 B1 | 6/2001 | Moore |
| 6,250,014 B1 | 6/2001 | Rusiana |

(56) References Cited

U.S. PATENT DOCUMENTS

| | | |
|---|---|---|
| 6,259,352 B1 | 7/2001 | Yulkowski et al. |
| 6,260,236 B1 | 7/2001 | Toledo |
| 6,266,847 B1 | 7/2001 | Krumhauer |
| 6,282,750 B1 | 9/2001 | Bishop et al. |
| 6,296,230 B1 | 10/2001 | Roth |
| 6,298,520 B1 | 10/2001 | Blickhahn et al. |
| 6,308,749 B1 | 10/2001 | Brossard et al. |
| 6,312,803 B1 | 11/2001 | Mendis |
| 6,314,683 B1 | 11/2001 | Vesa et al. |
| 6,317,922 B1 | 11/2001 | Kondratuk |
| 6,317,996 B1 | 11/2001 | Myers et al. |
| 6,345,412 B1 | 2/2002 | Law |
| 6,354,343 B1 | 3/2002 | Strnad et al. |
| 6,374,505 B2 | 4/2002 | Myers et al. |
| 6,375,018 B1 | 4/2002 | Clement |
| 6,397,430 B1 | 6/2002 | Brown et al. |
| 6,397,431 B1 | 6/2002 | Alonso |
| 2001/0007163 A1 | 7/2001 | Alonso |
| 2001/0013762 A1 | 8/2001 | Roman |
| 2001/0052728 A1 | 12/2001 | Larsson et al. |
| 2001/0054260 A1 | 12/2001 | Plum et al. |
| 2002/0007563 A1 | 1/2002 | Myers et al. |
| 2002/0007564 A1 | 1/2002 | Myers et al. |
| 2002/0063430 A1 | 5/2002 | Amano |
| 2002/0066157 A1 | 6/2002 | Chen |
| 2002/0066228 A1 | 6/2002 | Janutta et al. |
| 2002/0070564 A1 | 6/2002 | Ohta et al. |

FOREIGN PATENT DOCUMENTS

| | | |
|---|---|---|
| AU | 4481096 | 9/1996 |
| AU | 6635998 | 9/1998 |
| AU | 3246999 | 8/1999 |
| AU | 3350399 | 10/1999 |
| AU | 3443599 | 11/1999 |
| AU | 2305214 | 2/2000 |
| AU | 4139599 | 2/2000 |
| AU | 5623899 | 3/2000 |
| AU | 1792300 | 8/2000 |
| AU | 2106400 | 8/2000 |
| AU | 2313300 | 8/2000 |
| AU | 3918401 | 9/2001 |
| CA | 2320809 | 6/2000 |
| CA | 2321871 | 7/2000 |
| CA | 2305994 | 10/2000 |
| CA | 2311054 | 12/2000 |
| CN | 1083161 | 3/1994 |
| CN | 1219214 | 6/1999 |
| CN | 1230624 | 10/1999 |
| CN | 1248660 | 3/2000 |
| CN | 1266938 | 9/2000 |
| DE | 19500844 | 11/1995 |
| DE | 19501565 | 7/1996 |
| DE | 19506355 | 9/1996 |
| DE | 19540505 | 5/1997 |
| DE | 19540506 | 5/1997 |
| DE | 19606204 | 5/1997 |
| DE | 19547683 | 6/1997 |
| DE | 19607878 | 9/1997 |
| DE | 19614467 | 10/1997 |
| DE | 19719324 | 2/1998 |
| DE | 19714002 | 10/1998 |
| DE | 19715270 | 10/1998 |
| DE | 19717817 | 10/1998 |
| DE | 19725355 | 12/1998 |
| DE | 19728967 | 1/1999 |
| DE | 19734401 | 2/1999 |
| DE | 19803790 | 8/1999 |
| DE | 19828034 | 12/1999 |
| DE | 19831783 | 1/2000 |
| DE | 19834889 | 2/2000 |
| DE | 10018725 | 12/2000 |
| DE | 10032418 | 3/2001 |
| DE | 10015769 | 5/2001 |
| DE | 10023763 | 11/2001 |
| DE | 10030325 | 1/2002 |
| DE | 10030332 | 1/2002 |
| DE | 10031786 | 1/2002 |
| EP | 0867587 | 9/1998 |
| EP | 0889190 | 1/1999 |
| EP | 0919688 | 6/1999 |
| EP | 0922151 | 6/1999 |
| EP | 0931895 | 7/1999 |
| EP | 0941947 | 9/1999 |
| EP | 0956415 | 11/1999 |
| EP | 0972902 | 1/2000 |
| EP | 0993535 | 4/2000 |
| EP | 1030140 | 8/2000 |
| EP | 1042576 | 10/2000 |
| EP | 1051558 | 11/2000 |
| EP | 1062401 | 12/2000 |
| EP | 1064446 | 1/2001 |
| EP | 1066443 | 1/2001 |
| EP | 1073821 | 2/2001 |
| EP | 1076141 | 2/2001 |
| EP | 1081317 | 3/2001 |
| EP | 1096094 | 5/2001 |
| EP | 1101893 | 5/2001 |
| EP | 1120523 | 8/2001 |
| EP | 1126117 | 8/2001 |
| EP | 1126118 | 8/2001 |
| EP | 1126119 | 8/2001 |
| EP | 1134349 | 9/2001 |
| EP | 1134350 | 9/2001 |
| EP | 1141508 | 10/2001 |
| EP | 1159503 | 12/2001 |
| EP | 1219770 | 7/2002 |
| FR | 2738865 | 3/1997 |
| FR | 2760780 | 9/1998 |
| FR | 2763104 | 11/1998 |
| FR | 2766513 | 1/1999 |
| FR | 2790275 | 9/2000 |
| FR | 2798693 | 3/2001 |
| GB | 1000864 | 8/1965 |
| GB | 1014354 | 12/1965 |
| GB | 1039690 | 8/1966 |
| GB | 1103857 | 2/1968 |
| GB | 1103966 | 2/1968 |
| GB | 1142819 | 2/1968 |
| GB | 1114973 | 5/1968 |
| GB | 1120102 | 7/1968 |
| GB | 1400661 | 7/1975 |
| GB | 2082248 | 3/1982 |
| GB | 2190954 | 12/1987 |
| GB | 2192426 | 1/1988 |
| GB | 2204093 | 11/1988 |
| GB | 2214566 | 9/1989 |
| GB | 2257590 | 1/1993 |
| JP | 10292720 | 11/1998 |
| JP | 10292722 | 11/1998 |
| JP | 10325276 | 12/1998 |
| JP | 10330061 | 12/1998 |
| JP | 11050736 | 2/1999 |
| JP | 11050739 | 2/1999 |
| JP | 1187278 | 3/1999 |
| JP | 11081788 | 3/1999 |
| JP | 11093501 | 4/1999 |
| JP | 11104058 | 4/1999 |
| JP | 11125059 | 5/1999 |
| JP | 11141202 | 5/1999 |
| JP | 11141226 | 5/1999 |
| JP | 11159238 | 6/1999 |
| JP | 11166355 | 6/1999 |
| JP | 11190165 | 7/1999 |
| JP | 11270220 | 10/1999 |
| JP | 11303483 | 11/1999 |
| JP | 11303495 | 11/1999 |
| JP | 11303501 | 11/1999 |
| JP | 11311055 | 11/1999 |
| JP | 11315662 | 11/1999 |
| JP | 11324450 | 11/1999 |
| JP | 11324474 | 11/1999 |
| JP | 11324482 | 11/1999 |

(56) References Cited

FOREIGN PATENT DOCUMENTS

| | | |
|---|---|---|
| JP | 11324484 | 11/1999 |
| JP | 11324487 | 11/1999 |
| JP | 11324489 | 11/1999 |
| JP | 11336416 | 12/1999 |
| JP | 11336424 | 12/1999 |
| JP | 2000008696 | 1/2000 |
| JP | 2000017943 | 1/2000 |
| JP | 2000017944 | 1/2000 |
| JP | 2000045624 | 2/2000 |
| JP | 2000054723 | 2/2000 |
| JP | 2000104431 | 4/2000 |
| JP | 2000130005 | 5/2000 |
| JP | 2000160925 | 6/2000 |
| JP | 2000186460 | 7/2000 |
| JP | 2000192726 | 7/2000 |
| JP | 2000204841 | 7/2000 |
| JP | 2000240349 | 9/2000 |
| JP | 2000240350 | 9/2000 |
| JP | 2000291326 | 10/2000 |
| JP | 2001003621 | 1/2001 |
| JP | 2001012138 | 1/2001 |
| JP | 2001032618 | 2/2001 |
| JP | 2001049923 | 2/2001 |
| JP | 2001049924 | 2/2001 |
| JP | 2001049946 | 2/2001 |

\* cited by examiner

INTELLIGENT DOOR RESTRAINT

CROSS REFERENCE TO RELATED APPLICATIONS

The present application is a Continuation of U.S. patent application Ser. No. 13/542,733, filed Jul. 6, 2012, which is a Continuation of U.S. patent application Ser. No. 11/290,168, filed Nov. 30, 2005, now U.S. Pat. No. 8,225,458, issued Jul. 24, 2012, which is a Continuation of U.S. patent application Ser. No. 10/196,684, filed Jul. 15, 2002, which claims benefit of priority from Provisional U.S. Patent Application No. 60/305,130, filed Jul. 13, 2001, the entirety of which are each expressly incorporated herein by reference.

FIELD OF THE INVENTION

The present invention relates to the field of automatic door closing devices, and in particular devices that hold a door open to allow people to pass through.

BACKGROUND OF THE INVENTION

Door closing devices are well known, and have existed for centuries. A simple string, pulley and counterweigh is sufficient to close a door after opening. Modern designs incorporate hydraulic or pneumatic devices to moderate the closure rate.

Modern designs also include fully automatic door controls, which are expensive, and typically require continuous availability of power. These systems are almost universally electrically powered, and employ line power with limited or lacking facilities for closely coupled backup.

A typical door closing device provides sufficient closure force to overcome a strong wind, friction, or to push small objects. Due to the damper in the door, a typical symmetric damping function, and a requirement to arm the device while opening the door, opening a door having an automatic door closing device involves application of a significant force. Perhaps more importantly, if a stream of people seek to pass through the door, it is necessary, or polite, for the first person through to hold the door for later people. This often results in significant delays and bottlenecks, since the person holding the door open often must stand in the door passage, applying a force, or stand in a contorted position to avoid being in the doorway.); Hydraulic and pneumatic door closures for controlling closing characteristics of swing doors are well known and have been widely used. See, for example, U.S. Pat. Nos. 4,793,023, 4,414,703 and 4,378,612. Primarily hydraulically, pneumatically operated openers, or opening assist mechanisms are also known. U.S. Pat. Nos. 3,948,000, 3,936,977, 4,955,194 and 4,429,490 teach such mechanisms. Additionally, a variety of electromechanical automatic door operators are known. See, for example, U.S. Pat. Nos. 2,910,290, 3,127,160, 4,045,914 and 4,220,051. Each type of door opener, hydraulic, pneumatic and electromechanical, has its own advantages and disadvantages. It has also been known to combine these mechanisms in order to obtain some of the advantages of each. See, for example, U.S. Pat. Nos. 3,874,117, 3,129,936, 1,684,704, 2,256,613, and 4,438,835. See also, U.S. Pat. No. 5,956,249, expressly incorporated herein by reference.

Thus, there is a need for an improved device for closing doors which is power efficient and avoids the requirement for manual override for a second person passing though the door. See, for example, U.S. Pat. Nos. 6,138,412; 6,002,217; 5,992,444; 4,580,365; 5,488,896; expressly incorporated herein by reference.

See also, patents now in US Class 16/62, each patent therein being expressly incorporated herein by reference, including but not limited to U.S. Pat. No. 6,154,924 (Door closer unit); U.S. Pat. No. 6,151,753 (Door closer to generate a sudden change in the transmission ratio during the closing phase); U.S. Pat. No. 6,047,440 (Non-rotating pinion cap); U.S. Pat. No. 5,943,736 (Door closer); U.S. Pat. No. 5,802,670 (Door closer); U.S. Pat. No. 5,553,353 (Door damping system); U.S. Pat. No. 5,535,514 (Method for making a hydraulic door closer having a one-piece molded housing body); U.S. Pat. No. 5,502,874 (Speed regulating valve for fluid filled door closers); U.S. Pat. No. 5,343,593 (Door closer); U.S. Pat. No. 5,272,787 (Overhead concealed door closer, mechanically, hydraulically operated); U.S. Pat. No. 5,265,306 (Automatic door closing device); U.S. Pat. No. 5,259,090 (Fluid door closer with means to permit entrapped gases to move); U.S. Pat. No. 5,219,372 (Door accessory with a hydraulic retarding device); U.S. Pat. No. 5,206,971 (Apparatus and method for increasing the efficiency of a door closer by reducing friction therein); U.S. Pat. No. 5,001,809 (Door apparatus with damper switch); U.S. Pat. No. 4,999,872 (Door closer); U.S. Pat. No. 4,979,261 (Variable position door closer); U.S. Pat. No. 4,967,444 (Device for damping the closing movement of a dual door spring-loaded or closure and closure control therefor); U.S. Pat. No. 4,937,914 (Door control device); U.S. Pat. No. 4,793,023 (Door closer and holder); U.S. Pat. No. 4,763,385 (Door closure transmission utilizing an eccentric pinion); U.S. Pat. No. 4,744,125 (Door closer transmission including an eccentric pinion); U.S. Pat. No. 4,686,739 (Door closer); U.S. Pat. No. 4,665,583 (Door closer piston assembly having separate head portions); U.S. Pat. No. 4,653,229 (Holding installation for double doors); U.S. Pat. No. 4,502,180 (Door control device having piston assembly with separately formed rack); U.S. Pat. No. 4,455,708 (Door closer having a braking mechanism comprising an elastomeric bag); U.S. Pat. No. 4,419,786 (Door closer assembly); U.S. Pat. No. 4,414,703 (Door closer and holder); U.S. Pat. No. 4,394,787 (Hydraulic door closer construction); U.S. Pat. No. 4,387,482 (Modular single or double action door closure system); U.S. Pat. No. 4,378,612 (Door closer delayed action speed control system); U.S. Pat. No. 4,339,843 (Door closer with assist or door operating features); U.S. Pat. No. 4,263,694 (Door closer); U.S. Pat. No. 4,234,996 (Automatic door closer constructed for releasably holding a door in a predetermined partly open position); U.S. Pat. No. 4,222,147 (Door closer with assist or door operating features); U.S. Pat. No. 4,160,304 (Hold-open accessory for a door closer); U.S. Pat. No. 4,115,897 (Zero force hold open door closer); U.S. Pat. No. 4,097,956 (Hydraulic door operator with overtravel restraint); U.S. Pat. No. 4,080,687 (Door closer); U.S. Pat. No. 4,019,220 (Piston assembly for door closer); U.S. Pat. No. 4,010,572 (Door closer having means to neutralize the door closing force exerted thereby); U.S. Pat. No. 3,934,307 (Spring adjustment mechanism); U.S. Pat. No. 3,875,612 (16/48.5 16/51 16/62 251/129.2); U.S. Pat. No. 3,852,846 (16/48.5 16/51 16/62 251/129.03); U.S. Pat. No. 3,822,438 (16/62 74/435); U.S. Pat. No. 3,771,195 (16/48.5 16/62 49/1); U.S. Pat. No. 3,714,677 (16/62 16/52 16/72 16/85); U.S. Pat. No. 3,675,270 (16/53 16/62); U.S. Pat. No. 3,624,864 (16/62 49/386 119/716); U.S. Pat. No. 3,595,177 (105/377.09 16/62 49/339 70/80 292/160); U.S. Pat. No. 3,574,886 (16/51 16/52 16/58 16/62 188/280 188/284); U.S. Pat. No. 3,546,734 (16/52 16/62); U.S. Pat. No. 3,491,993 (267/126 16/62 188/267 188/285 188/287 213/43 267/34);

U.S. Pat. No. 3,426,383 (16/62); U.S. Pat. No. 3,426,382 (16/49 16/62); U.S. Pat. No. 3,396,424 (16/62 16/51); U.S. Pat. No. 3,394,499 (49/340 16/62 49/356); U.S. Pat. No. 3,337,902 (16/62); U.S. Pat. No. 3,255,482 (16/62 16/51 16/56); U.S. Pat. No. 3,220,047 (16/62); U.S. Pat. No. 3,156,002 (16/79 16/49 16/62 16/69); U.S. Pat. No. 3,135,991 (16/62 16/64 16/69 16/79 49/386); U.S. Pat. No. 3,087,720 (49/30 16/62 49/336 188/289); U.S. Pat. No. 3,059,268 (16/62 29/445 29/447 92/138 92/169.1 188/285 188/287); U.S. Pat. No. 3,054,136 (16/62 92/136 137/508 137/853 188/287 251/331 277/500); U.S. Pat. No. 3,042,957 (16/62 16/49 16/DIG9 188/287 267/114); U.S. Pat. No. 3,040,372 (16/62 16/49 188/317 267/173 277/346 277/434 277/500 277/910 403/33 403/111); U.S. Pat. No. 2,933,755 (16/55 16/62 16/DIG9 74/89.18); U.S. Pat. No. 2,909,801 (16/62 16/82 188/297); U.S. Pat. No. 2,790,991 (16/62 188/318); U.S. Pat. No. 2,774,987 (16/62); U.S. Pat. No. 2,723,416 (16/52 16/62 248/298.1); U.S. Pat. No. 2,680,263 (16/55 16/62 16/DIG9); U.S. Pat. No. 2,471,707 (16/62 16/DIG9); U.S. Pat. No. 2,209,553 (16/62 16/75); U.S. Pat. No. 2,116,185 (16/62 16/55); U.S. Pat. No. 2,059,385 (16/62); U.S. Pat. No. 2,045,076 (16/62 16/51 16/64 16/69); U.S. Pat. No. 2,024,472 (16/49 16/62 16/DIG9 16/DIG10); U.S. Pat. No. 2,015,837 (16/55 16/56 16/62 74/31 188/304); U.S. Pat. No. 1,999,274 (16/62); U.S. Pat. No. 1,996,117 (16/62 16/49 16/59); U.S. Pat. No. 1,949,758 (16/62 16/55); U.S. Pat. No. 1,921,314 (16/49 16/62 16/82 16/86A 16/91); U.S. Pat. No. 1,886,897 (16/55 16/62); U.S. Pat. No. 1,872,561 (16/62); U.S. Pat. No. 1,786,782 (16/62 49/363); U.S. Pat. No. 1,770,250 (16/56 16/59 16/62 74/32 74/89.12); U.S. Pat. No. 1,763,323 (16/62 16/49 16/DIG17 292/263 292/275); U.S. Pat. No. 1,753,214 (16/62); U.S. Pat. No. 1,711,626 (16/62 292/DIG15); U.S. Pat. No. 1,674,756 (16/62 16/59 16/DIG21 137/553 251/207); U.S. Pat. No. 1,627,113 (267/224 16/62 16/64 16/69); U.S. Pat. No. 1,595,722 (16/62 16/281 16/DIG20 16/DIG21); U.S. Pat. No. 1,253,369 (16/62); U.S. Pat. No. 1,220,469 (16/62); U.S. Pat. No. 1,214,535 (16/62); U.S. Pat. No. 1,211,337 (16/62 188/304); U.S. Pat. No. 1,190,324 (16/62); U.S. Pat. No. 1,178,688 (16/62 188/289 277/520); U.S. Pat. No. 1,177,641 (16/62); U.S. Pat. No. 1,170,482 (16/62); U.S. Pat. No. 1,155,310 (16/62); U.S. Pat. No. 1,152,339 (16/62 49/137); U.S. Pat. No. 1,147,909 (16/51 16/62); U.S. Pat. No. 1,130,923 (16/62); U.S. Pat. No. 1,129,712 (16/62); U.S. Pat. No. 1,123,810 (16/62); U.S. Pat. No. 1,123,780 (16/62); U.S. Pat. No. 1,121,084 (16/62); U.S. Pat. No. 1,117,693 (16/62); U.S. Pat. No. 1,097,605 (16/62 16/51); U.S. Pat. No. 1,097,604 (16/62 16/49 16/71); U.S. Pat. No. 1,025,309 (16/62 16/278 292/2); U.S. Pat. No. 1,019,857 (16/62 16/51); U.S. Pat. No. 1,017,714 (16/62); U.S. Pat. No. 1,003,653 (16/62); U.S. Pat. No. 1,003,651 (16/62); U.S. Pat. No. 998,732 (16/62 251/310); U.S. Pat. No. 970,445 (16/62); U.S. Pat. No. 962,143 (16/62); U.S. Pat. No. 960,641 (16/62); U.S. Pat. No. 884,789 (16/62); U.S. Pat. No. 868,357 (16/62 16/49 188/130 188/304); U.S. Pat. No. 859,737 (60/573 16/62 60/594 74/99R); U.S. Pat. No. 732,369 (16/62); U.S. Pat. No. 727,051 (16/62 251/229); U.S. Pat. No. 724,325 (16/62); U.S. Pat. No. 722,369 (406/165 16/62); U.S. Pat. No. 696,116 (16/62 16/49); U.S. Pat. No. 679,905 (16/62); U.S. Pat. No. 672,237 (16/62); U.S. Pat. No. 669,158 (16/62); U.S. Pat. No. 655,107 (16/62); U.S. Pat. No. 633,682 (16/62); U.S. Pat. No. 633,015 (16/62); U.S. Pat. No. 632,697 (16/62); U.S. Pat. No. 629,001 (16/62); U.S. Pat. No. 627,828 (16/62 16/32 16/DIG39 267/34 267/218 267/223); U.S. Pat. No. 627,717 (16/62); U.S. Pat. No. 602,688 (16/62); U.S. Pat. No. 602,687 (16/62); U.S. Pat. No. 577,917 (16/62).

See, further, US patents listed below, expressly incorporated herein by reference: U.S. Pat. No. 6,259,352 (Door lock system); U.S. Pat. No. 6,250,014 (Compact door coordinator); U.S. Pat. No. 6,240,598 (Arrangement for controlling an angularly movable member); U.S. Pat. No. 6,237,647 (Automatic refueling station); U.S. Pat. No. 6,227,508 (Adjustable support apparatus); U.S. Pat. No. 6,223,469 (Pivot-hung door drive); U.S. Pat. No. 6,209,431 (Automated degate and trim machine); U.S. Pat. No. 6,199,322 (Method and apparatus for automatically driving an open/close body); U.S. Pat. No. 6,167,589 (Control mechanism including a permanent magnet system); U.S. Pat. No. 6,112,368 (Temperature compensating valve); U.S. Pat. No. 6,079,162 (Partition forming a draft-free fire barrier; and a draft-free fire barrier; and, further, methods of their operation); U.S. Pat. No. 6,065,184 (Apparatus for automatic closing of sliding doors); U.S. Pat. No. 6,061,964 (Portable remote controlled door closer); U.S. Pat. No. 6,050,117 (Motor vehicle door lock or the like); U.S. Pat. No. 6,049,444 (Rotatable door and door opening mechanism for a cartridge); U.S. Pat. No. 6,049,287 (Door with integrated smoke detector and hold open); U.S. Pat. No. 6,032,331 (Checking mechanisms with variable plane trigger plates); U.S. Pat. No. 5,992,444 (Control device for door closer); U.S. Pat. No. 5,956,249 (Method for electromechanical control of the operational parameters of a door in conjunction with a mechanical door control mechanism); U.S. Pat. No. 5,953,789 (Checking mechanism for reciprocative devices); U.S. Pat. No. 5,944,367 (Door closing apparatus); U.S. Pat. No. 5,927,766 (Latching mechanism for a motor control center); U.S. Pat. No. 5,913,763 (Method for controlling the operational modes of a door in conjunction with a mechanical door control mechanism); U.S. Pat. No. 5,910,075 (Portable remote-controlled door closer); U.S. Pat. No. 5,901,992 (Electromechanical locking mechanism for door leaves having a door closing device); U.S. Pat. No. 5,899,169 (Automatic hay, grain and pellet feeder for livestock); U.S. Pat. No. 5,878,530 (Remotely controllable automatic door operator permitting active and passive door operation); U.S. Pat. No. 5,862,630 (Door closer); U.S. Pat. No. 5,850,671 (Door closer); U.S. Pat. No. 5,829,098 (Reinforcement basal attachment plate for reciprocating operative device); U.S. Pat. No. 5,829,097 (Hold open control for a door closer); U.S. Pat. No. 5,813,739 (Flammable material storage cabinet); U.S. Pat. No. 5,813,282 (Powered sliding-door system and actuating devices for the same); U.S. Pat. No. 5,806,246 (Powered sliding-door system and actuating devices for the same); U.S. Pat. No. 5,804,931 (Wall partition system and a device and method for the operation of a wall partition system); U.S. Pat. No. 5,789,887 (Automatic door); U.S. Pat. No. 5,771,635 (Pneumatic device and system); U.S. Pat. No. 5,732,508 (Gate closer); U.S. Pat. No. 5,727,348 (Portable remote controlled door closer); U.S. Pat. No. 5,727,286 (Door closer with a pneumatic dashpot); U.S. Pat. No. 5,709,009 (Door closer for the non-fire side of a fire-door safety installation); U.S. Pat. No. 5,706,765 (Method and apparatus for cooping chickens); U.S. Pat. No. 5,706,551 (Door closers and dampers primarily for door closers); U.S. Pat. No. 5,687,507 (Apparatus for selective alteration of operating parameters of a door); U.S. Pat. No. 5,687,451 (Revolving door device); U.S. Pat. No. 5,681,140 (Multiple compartment body for waste materials); U.S. Pat. No. 5,666,692 (Adjustable power closure); U.S. Pat. No. 5,657,511 (Piston-type door closer with adjustable closing speeds); U.S. Pat. No. 5,651,536 (Combined door closer/hinge with variable rotary friction damping performance); U.S. Pat. No. 5,651,216 (Door closer for a two-panel door with a closing sequence control mechanism); U.S. Pat. No. 5,638,639 (Emergency door with retractable nose piece, interiorly mounted operating hardware, and hinge supports); U.S. Pat. No. 5,592,902 (Method and apparatus for cooping chickens); U.S. Pat. No. 5,592,780 (Door position controlling apparatus); U.S. Pat. No. 5,579,607 (Convenient automatic closing system for doors); U.S. Pat. No. 5,572,768 (Door closer); U.S. Pat. No. 5,553,521 (Door spring adjusting tool); U.S. Pat. No. 5,542,216 (Sliding door closing device); U.S. Pat. No. 5,525,963 (Apparatus for actuating a safety device); U.S. Pat. No. 5,517,719 (Adjustable delayed-action door closer); U.S. Pat. No. 5,515,649 (Automatic door operator); U.S. Pat. No. 5,513,469 (Retractable sliding door); U.S. Pat. No. 5,513,467 (Linear drive power door operator); U.S. Pat. No. 5,511,284 (Door hold open device); U.S. Pat. No. 5,510,686 (Automated garage door closer); U.S. Pat. No. 5,507,120 (Track driven power door operator); U.S. Pat. No. 5,497,533 (Surface mounted door closer housing resistant to vandalism); U.S. Pat. No. 5,488,896 (Self aligning piston rod); U.S. Pat. No. 5,487,206 (Door control device); U.S. Pat. No. 5,477,589 (Piston-type door closer with adjustable closing speeds); U.S. Pat. No. 5,471,708 (Pneumatic door closer); U.S. Pat. No. 5,437,079 (Door hinge); U.S. Pat. No. 5,417,013 (Overhead door closer with slide rail for concealed installation in door panels or door frames); U.S. Pat. No. 5,414,894 (Door closer); U.S. Pat. No. 5,392,562 (Universal mounting plate for door opener); U.S. Pat. No. 5,386,885 (Electromechanical pivot wing drive for pivoting wings of doors or the like); U.S. Pat. No. 5,386,614 (Door closer); U.S. Pat. No. 5,382,016 (Sheet sorter with a stapler having a controlled sheet aligning member); U.S. Pat. No. 5,375,861 (No-hands baby stroller); U.S. Pat. No. 5,309,676 (Balanced door closing apparatus); U.S. Pat. No. 5,291,630 (Damper and method of controlling a door); U.S. Pat. No. 5,254,040 (Handball—squash court conversion system); U.S. Pat. No. 5,253,782 (Article dispensing apparatus); U.S. Pat. No. 5,251,400 (Control for a door closer having a power-assist opening feature); U.S. Pat. No. 5,246,258 (Rim type door lock with interchangeable bolt assemblies and adjustable backset plate assemblies); U.S. Pat. No. 5,239,778 (Modular door control apparatus with quick release connection); U.S. Pat. No. 5,224,677 (Pull down display and storage apparatus); U.S. Pat. No. 5,216,418 (Emergency service rescue marker); U.S. Pat. No. 5,192,398 (Coke box with indirectly cooled receiving chamber and exhaust gas burner); U.S. Pat. No. 5,191,678 (Wind resistant door hardware); U.S. Pat. No. 5,190,617 (Coke handling apparatus including coke box and carrier vehicle); U.S. Pat. No. 5,138,795 (Power sliding door closer); U.S. Pat. No. 5,135,083 (Input responsive damper); U.S. Pat. No. 5,090,089 (Automatic door closing device); U.S. Pat. No. 5,083,342 (Door closure delay device); U.S. Pat. No. 5,048,151 (Mechanical door check); U.S. Pat. No. 5,046,283 (Power sliding door closer); U.S. Pat. No. 5,033,234 (Door coordinator); U.S. Pat. No. 5,027,553 (Garage door closing apparatus); U.S. Pat. No. 5,027,473 (Refrigerator door closer); U.S. Pat. No. 5,020,189 (Door closure mechanism); U.S. Pat. No. 5,012,608 (Spray boom); U.S. Pat. No. 5,005,881 (Door locking mechanism); U.S. Pat. No. 5,002,331 (Pedal actuated vehicle door closer); U.S. Pat. No. 4,997,527 (Coke handling and dry quenching method); U.S. Pat. No. 4,995,194 (Power-assist door closer); U.S. Pat. No. 4,973,894 (Method and arrangement for optimizing of the function of a door closer); U.S. Pat. No. 4,958,144 (Water-flow detector); U.S. Pat. No. 4,944,066 (Adjustable closer arm); U.S. Pat. No. 4,937,913 (Door closer); U.S. Pat. No. 4,935,989 (Pneumatic door closer with sustained closing force during closure); U.S. Pat. No. 4,916,267 (Door closer position monitor); U.S. Pat. No. 4,884,369 (Sliding door closer); U.S. Pat. No. 4,878,265 (Hold-open mechanism for use with a door closer); U.S. Pat. No. 4,876,764 (Closer having door position indicator); U.S. Pat. No. 4,844,567 (Vending machine with controlled return access door); U.S. Pat. No. 4,835,905 (Door position indicator for a door closer); U.S. Pat. No. 4,821,521 (Positioning drive for a motor vehicle door closing device); U.S. Pat. No. 4,803,754 (Electromechanical door holder-closer); U.S. Pat. No. 4,791,414 (Water-flow detector); U.S. Pat. No. 4,788,742 (Torque modification apparatus for use with a door closer); U.S. Pat. No. 4,783,882 (Door closer assembly); U.S. Pat. No. 4,782,333 (Water-flow detector with rapid switching); U.S. Pat. No. 4,763,111 (Door closer having sound generating function); U.S. Pat. No. 4,754,522 (Door holders for selectively positioning doors against closure); U.S. Pat. No. 4,750,236 (Track-type door hold-open device); U.S. Pat. No. 4,722,116 (Remote setting-control mechanism for a door-closer latch); U.S. Pat. No. 4,721,946 (Door control device with alarm switch); U.S. Pat. No. 4,709,445 (Method and apparatus for closing a door); U.S. Pat. No. 4,707,882 (Pneumatic damper); U.S. Pat. No. 4,669,147 (Door closer); U.S. Pat. No. 4,665,584 (Buoyant valve member closing device for doors); U.S. Pat. No. 4,663,887 (Apparatus for controlling the closing sequence of double doors); U.S. Pat. No. 4,663,800 (Holding device for door closers); U.S. Pat. No. 4,660,250 (Door closer); U.S. Pat. No. 4,649,598 (Energy saver sliding door closer including a valved weight); U.S. Pat. No. 4,648,151 (Jamb plate for door closer); U.S. Pat. No. 4,593,584 (Power tongs with improved hydraulic drive); U.S. Pat. No. 4,583,324 (Apparatus for controlling the closing sequence of double leaved doors); U.S. Pat. No. 4,575,880 (Auto-flush system); U.S. Pat. No. 4,573,238 (Door closer incorporating self-cleaning and temperature compensating flow control valve); U.S. Pat. No. 4,561,343 (Sequencing valve mechanism); U.S. Pat. No. 4,534,278 (Livestock confinement building wall-vent controller); U.S. Pat. No. 4,513,953 (Gas spring with extension force controlled as a function of temperature); U.S. Pat. No. 4,506,407 (Releasable hold-open device for a door closer); U.S. Pat. No. 4,501,090 (Automatic door operator for swing doors); U.S. Pat. No. 4,498,112 (Tape cartridge receptacle); U.S. Pat. No. 4,486,917 (Door closer with a compressible braking sleeve); U.S. Pat. No. 4,485,522 (Door-closing hinge having a spring and pin mechanism); U.S. Pat. No. 4,483,044 (Pneumatic door closer having resilient braking sleeve and cooperating piston rod incremental braking enlargements); U.S. Pat. No. 4,419,787 (Door closer assist linkage); U.S. Pat. No. 4,401,346 (Apparatus for controlling the operation of a door); U.S. Pat. No. 4,386,446 (Door closer); U.S. Pat. No. 4,375,735 (Air lock door control apparatus); U.S. Pat. No. 4,371,201 (Reversing ratchet door closer); U.S. Pat. No. 4,365,442 (Automatic door control system); U.S. Pat. No. 4,358,870 (Hydraulic hinge with door closing mechanism); U.S. Pat. No. 4,349,939 (Automatic door closer); U.S. Pat. No. 4,348,835 (Automatic door opening device); U.S. Pat. No. 4,317,254 (Door closer); U.S. Pat. No. 4,298,140 (Newspaper and magazine vending machine); U.S. Pat. No. 4,290,161 (Automated carwash brush assembly); U.S. Pat. No. 4,289,995 (Electric door operator with slip clutch and dynamic braking); U.S. Pat. No. 4,287,639 (Door closer permitting free-swing and regular-closer modes); U.S. Pat. No. 4,286,411 (Manual balanced door with door closer arm); U.S. Pat. No. 4,285,094 (Door closing apparatus); U.S. Pat. No. 4,267,619 (Controlled release door holder); U.S. Pat. No. 4,254,308 (Vandal resistant public telephone); U.S. Pat. No. 4,237,578 (Releasable retaining means and fire door control system); U.S. Pat. No. 4,232,798 (Automatic vending machine for delivering containers having edible product therein); U.S. Pat. No. 4,185,356 (Door closer); U.S. Pat. No. 4,179,092 (Mounting device for door closer); U.S. Pat. No. 4,161,804 (Heat-actuated door latch); U.S. Pat. No. 4,161,183 (Vibration sensitive valve operating apparatus); U.S. Pat. No. 4,155,199 (Lockable gate mechanism with automatic reindexing feature); U.S. Pat. No. 4,155,144 (Damper device); U.S. Pat. No. 4,151,380 (Post mounted public telephone); U.S. Pat. No. 4,148,111 (Temperature compensating hydraulic door closer); U.S. Pat. No. 4,146,405 (Unitary dishwasher); U.S. Pat. No. 4,139,182 (Spring device); U.S. Pat. No. 4,130,913 (Door closer); U.S. Pat. No. 4,121,319 (Releasable retaining means); U.S. Pat. No. 4,112,127 (Method for processing and filling a dough product); U.S. Pat. No. 4,103,392 (Door closing apparatus); U.S. Pat. No. 4,102,006 (Door closer); U.S. Pat. No. 4,102,005 (Door closer arm); U.S. Pat. No. 4,083,080 (Door closer); U.S. Pat. No. 4,079,479 (Sliding door closure and locking mechanism); U.S. Pat. No. 4,075,734 (Door closer); U.S. Pat. No. 4,069,546 (Soffit plate and limit stop for use with hydraulic door closer); U.S. Pat. No. 4,069,544 (Electrically actuated door holder and release); U.S. Pat. No. 4,067,084 (Automatic door closer); U.S. Pat. No. 4,064,589 (Door closer); U.S. Pat. No. 4,050,114 (Door closer assembly); U.S. Pat. No. 4,048,694 (Hydraulic door closer with adjustable time delay dampener); U.S. Pat. No. 4,040,144 (Door assister); U.S. Pat. No. 4,034,437 (Pressure-free fail-safe emergency door closer); U.S. Pat. No. 4,016,381 (Switch arrangement for door closers); U.S. Pat. No. 3,989,286 (Device for arresting a door); U.S. Pat. No. 3,966,289 (Electric power coupler); U.S. Pat. No. 3,935,614 (Electro-mechanical door holder-closer); U.S. Pat. No. 3,934,306 (Door closure device).

See also the following patents relating to door closers, which are expressly incorporated herein by reference: IN175305 (A Spring Actuated Door Closer); EP1219770 (Swing Door With Sliding Arm Door Closer); US2002070564 (Door Closer); US2002066228 (Movable Partition With A Plurality Of Laterally Movable Wall Elements); US2002066157 (Door Closer); U.S. Pat. No. 6,397,431 (Spring Assembly Normally Inactive That Opts For Causing Towards Any Position With Reciprocative Door Closer Devices); U.S. Pat. No. 6,397,430 (Adjustable Hydraulic Backcheck Door Closer); US2002063430 (Door Lock Drive Unit); TW459890Y (Improved Structure Of Door Closer); TW459889Y (Improved Structure Of Door Closer); TW430014Y (Sliding Seat For Hydraulic Press Door Closer); TW430013Y (Oiling Control Device For Hydraulic Press Door Closer); IE890371L (DOOR CLOSER); IE800525L (DOOR CLOSER); NZ503115 (Door Closer); NZ502364 (Arrangement For Controlling An Angularly Movable Member); NZ502403 (Device For Controlling An Angularly Movable Member, Such As Overhead Door Closers And Floor Springs); U.S. Pat. No. 6,375,018 (Jewelry Support Rack); U.S. Pat. No. 6,374,505 (Installation Template For A Door Closer; PL346265 (DOOR CLOSER); JP2002038805 (CRIME PREVENTION DEVICE TO FIX DOOR CLOSER); JP2002038791 (DOOR CLOSER APPARATUS FOR VEHICLE); CN2483483U (Closer For Door); U.S. Pat. No. 6,354,343 (Automatic Fueling System And Components Therefor); CA2321871 (DOOR CLOSER); CA2320809 (DOOR CLOSER); CA2311054 (BALANCED DOOR CLOSING APPARATUS); CA2305994 (DOOR CLOSER); JP2002061453 (STOP-ANGLE ADJUSTING MECHANISM FOR DOOR CLOSER); CA2305214 (DOOR CLOSER); AU743753 (Door Closer); JP2002013343 (JOINT DEVICE FOR LINK MECHANISM FOR DOOR CLOSER); TW450308Y (Door Closer); U.S. Pat. No. 6,345,412 (Arrangement For Controlling An Angularly Movable Member); AU3918401 (Door Hinge With Integrated Door Closer); US2002007564 (Installation Template For A Door Closer); US2002007563 (INSTALLATION TEMPLATE FOR A DOOR CLOSER); ZA200000390 (Door Closer.); DE10031786 (Door Closer With Slide Rail And Shaft Comprises Basic And Positively Connected Reinforcing Modules Whose Shafts Protrude From Housing From); DE10030332 (Track For Fixing To Door Frames Or Door Leaves Comprises A Slider, Guide Surfaces Running At An Angle To The Vertical Central Plane Of The); DE10030325 (Slider For Door Frames/Leaves Is Arranged In A Guide Rail So That Moves In The Longitudinal Direction And Is Connected To A Tilting Arm Of); WO0198615 (CONFIGURATION FOR OPENING AND CLOSING A DOOR OR A GATE); US2001054260 (Patio Screen Door Closer); US2001052728 (Motor Vehicle Door Locking System Arrangement); CN2467721U (Closer And Opener With Friction Brake For Sliding Door); JP2001323720 (DOOR CLOSER); JP2001329743 (DOOR CLOSER); CN2463523U (Pneumatic Spring Door Closer); GB2362923 (Installation Template For A Door Closer); EP1159503 (DOOR CLOSER); U.S. Pat. No. 6,317,996 (Installation Template For A Door Closer); U.S. Pat. No. 6,317,922 (Door Closer); DE10023763 (Door With Door Closer Has Drive Housing Mounted To Engage In Or Through Recess Provided In Upper Edge Of At Least The Outer Pane); JP2001303847 (STOP DEVICE OF DOOR CLOSER); JP2001295544 (DOOR STOP ANGLE ADJUSTING MECHANISM FOR DOOR CLOSER); JP2001288956 (DOOR CLOSER); U.S. Pat. No. 6,314,683 (Seal); TW439851Y (Improved Door Closer); U.S. Pat. No. 6,312,803 (Process Of Manufacturing From Natural Fiber A Door Closer And Stopper Which Also Serves As A Scrapper, Wiper Or Mat; U.S. Pat. No. 6,308,749 (Process And Device For Transfer Of Sterile Products Between A Container And An Isolator); GB2361737 (Cavity Closer And Base Frame); CN2455886U (Sliding Door Closer); WO0165041 (DOOR HINGE WITH INTEGRATED DOOR CLOSER); U.S. Pat. No. 6,298,520 (Door Closer And Mounting Bracket); U.S. Pat. No. 6,296,230 (Door Lifting Device); PL342839 (DOOR CLOSER); EP1141508 (DOOR CLOSER MOUNTING BRACKET WITH SCREW HOLDERS); CN2451673U (Hinge Hidden Buffer Door Closer With Braking Device); JP2001234663 (STOPPER FOR DOOR CLOSER); JP2001214661 (JOINT DEVICE BETWEEN ARMS IN DOOR CLOSER); JP2001207723 (HINGED DOOR PROVIDED WITH DOOR CLOSER); JP2001200675 (STOP DEVICE FOR DOOR CLOSER); JP2001193345 (AUTOMATIC DOOR CLOSER); EP1134350 (Blocking Device For A Door Provided With A Door Closer); EP1134349 (Overhead Door Closer With Improved Means Of Rotation); U.S. Pat. No. 6,282,750 (Power Adjustment Size Indicator For A Door Closer); US2001013762 (Automated Garage Door Closer); SK4452000 (DOOR CLOSER); JP2001173306 (DOOR AUTOMATIC CLOSER; TW428658Y (Improvement On Door Closer); HU0101011 (DOOR CLOSER); EP1126119 (Door Closing Arrangement For Double Doors); EP1126118 (Door Closing Arrangement For Double Doors); EP1126117 (Adjustable Power Closure); WO0155541 (DRIVE ROD FITTING); U.S. Pat. No. 6,266,847 (Door Operator And Process For Operation Of A Door Operator); EP1120523 (Turning Device For Sectional Overhead Door); JP2001065233 (DOOR CLOSER); US2001007163 (Damper Assembly That Opts To Open Doors For Usage With Reciprocating Door Closer Devices); HU0100767 (DOOR CLOSER); CN2438809U (Closer For Sliding Door); U.S. Pat. No. 6,260,236 (Door Closer With Hydraulic Back Checking); KR202611Y (LOCKING DEVICE OF A HINGE SHAFT FOR A DOOR CLOSER); GB2358222 (Power Adjustment Size Indicator For A Door Closer);

KR202010Y (PISTON OF DOOR CLOSER); KR202006Y (CLOSE CONTROL OF DOOR CLOSER); KR198717Y (DOOR CLOSER); TW417716Y (Modified Hydraulic Door Closer); TW416465Y (Improved Positioning Structure Of Hydraulic Door Closer; KR265254 (DOOR CLOSER); GB897848 (Improvements In Or Relating To A Door Closer); GB754913 (Concealed Door Closer); CN2435488U (Door Closer With Folding Arm); CN1299433T (Hinge Type Automatic Door Closer); WO0142604 (SLIDING PANEL COMPRISING SEVERAL WALL ELEMENTS THAT CAN BE DISPLACED LATERALLY); U.S. Pat. No. 6,240,598 (Arrangement For Controlling An Angularly Movable Member); HU0003821 (DOOR CLOSER); CN2431369U (Automatic Door Closer); U.S. Pat. No. 6,234,520 (Method And Apparatus For Disabling An Airbag System In A Vehicle); KR190952Y (A AUTO STOPPER FOR DOOR CLOSER); KR190951Y (A AUTO STOPPER FIXED DEVICE FOR DOOR CLOSER); KR190950Y (A AUTO STOPPER FOR DOOR CLOSER); KR190914Y (DOOR CLOSER LEVER); CN1293733T (Door Closer); EP1101893 (Blocking Device For Door Closer, Electromagnet And Slider); DE10015769 (Door-Closer Comprises Three Self-Contained Stages Arranged So That Open-Hold-Close Functions Are Performable Through Interaction Of Elements . . . ); EP1096094 (Jack Apparatus For The Opening/Closing Of A Door Wing); DE19951610 (Closure Sequence Control For Two-Paneled Door Involves Door Having Stand Panel And Passage Panel Automatically Closed By Door Closer, Stop); GB750067 (Production And Treatment Of Filamentary Materials; GB217146 (Improved Door Closer And Check); GB413459 (Improvements In Or Relating To Door Closer); GB324872 (Door Closer); GB268623 (Adjustable Door-Closer For Motor-Car Doors); U.S. Pat. No. 6,205,615 (Door Closer); GB581425 (An Improved Automatic Door Closer And Check Device); GB542467 (Improvement In And Relating To Door Closer); GB495687 (Door Closer); DE19946516; WO0123202 (VEHICLE DOOR); U.S. Pat. No. 6,199,222 (Portable Combined Toilet And Waste Holding Tank); GB918777 (Door Closer); GB914660 (Automatic Door Closer); GB908001 (Automatic Door Closer); GB903664 (Door Closer Assembly); U.S. Pat. No. 6,185,868 (Automatic Closer Of Pop-Up Door Of Vehicle); U.S. Pat. No. 6,167,589 (Control Mechanism Including A Permanent Magnet System); GB937926 (Hydraulically Operated Door Closer); GB936320 (Concealed Overhead Door Closer); GB839419 (Door Closer With Expansion Chamber); GB775719 (Door Closer); GB774241 (Door Closer); U.S. Pat. No. 6,179,187 (Ergonomically Enhanced Backpack); U.S. Pat. No. 6,178, 698 (Balanced Door Closing Apparatus); GB978966 (Hydraulically Retarded Door Closer); GB978693 (Automatic Door Closer In Combination With Mechanism For Connecting It To A Door); GB879278 (Door Closer); FR2798693 (Automobile Door Lock For Increasing Travel Of Rod Comprises Lock Striker And Return Striker Articulated On Pivots Connected To Lock, Lock R); JP2001049946 (DOOR CLOSER HAVING STOPPER); JP2001049924 (DOOR CLOSER DEVICE); JP2001049923 (DOOR CLOSER DEVICE); GB991149 (A Process And Apparatus For Steel Manufacture); GB982139 (Improvements In Or Relating To A Door Closer); DE19940728 (Profiled Pin For Door Closer Has Plastics Pin Set In Longitudinal Slit Of End Part Of Closer To Be Axially Pretensioned By Screw With Tip); JP2001032618 (DOOR CLOSER TYPE HYDRAULIC HINGE); GB1014354 (Means For Connecting A Door To A Door Closer); GB1000864 (Door Closer); EP1081317 (Door Lock Device With Automatic Door Closing Mechanism); DE10032418 (Cylindrical Door Closer Has Damper And Gas Compression Spring In Cylinder With Sealing Packets For Time Constants); GB1120102 (Door-Closer); GB1114973 (Spring Operated Door Closer With A Hydraulic Check Device); GB1103966 (Automatic Door Closer); GB1103857 (Door Closer); GB1039690 (Door Closer); JP2001012138 (DOOR CLOSER); KR261344 (DOOR CLOSER BODY AND MANUFACTURING METHOD THEREOF); KR187638Y (DOOR CLOSER OF SHIELD ROOM); KR187613Y (DOOR CLOSER OF A HINGE TYPE); KR187428Y (FIREPROOF DOOR CLOSER); KR187352Y (DOOR CLOSER BODY INSERT MOLDED ALUMINUM PIPE); GB1142819 (Hydraulic Door-Closer); TW392032 (Hinge Type Automatic Door Closer); EP1076141 (Door Lock Device For Motor Vehicles); DE19938282 (Fire Safety Door Has Automatic Door Closer With Release Element Activated In Response To Fire For Operation Of Door Closure Element); JP2001003621 (DRIVING CONTROLLER FOR DOOR CLOSER DEVICE); EP1073821 (HINGE TYPE AUTOMATIC DOOR CLOSER); WO0105612 (IMPROVEMENTS TO TELESCOPIC GUIDES USED FOR FIXING NESTABLE DOORS OF RAILWAY WAGONS); 1E911745 (Door Closer); 1E911447 (Door Closer); DE19953570 (Hydraulic Door Closer Joint Has Axle Fitting Through Lower Rotary Cylinder, Fixing Cylinder And Upper Rotary Cylinder And Has Guide Element); U.S. Pat. No. 6,164,685 (Deployment Door For Air Bag Module); GB2351766 (Cavity Closer/Window Or Door Frame Fixing Clip); EP1066443 (DEVICE IN CONNECTION WITH MOUNTING OF A DOOR CLOSER); EP1064446 (DOOR CLOSER); EP1062401 (DOOR CLOSER); U.S. Pat. No. 6,154,924 (Door Closer Unit); DE10018725 (Closing Sequence Control Device For Two-Leaf Door With Door Closer Transmits Modulated And Encoded Signals Between Resting Leaf And Outer); JP2000291326 (DOOR CLOSER FOR OPENED DOOR); U.S. Pat. No. 6,151,753 (Door Closer To Generate A Sudden Change In The Transmission Ratio During The Closing Phase); KR179181Y (JIG FOR BODY OF DOOR CLOSER); CN1273620T (Door Closer); AU2313300 (Installation Template For A Door Closer); SG73357 (Floor-Mounted Door Closer Device); GR3033849T (AUTOMATIC DOOR CLOSER AND PROCESS FOR MOUNTING THE SAME); U.S. Pat. No. 6,145, 942 (Hold-Open Door Closure Assembly And Method For Using Same); KR173511Y (SPEED CONTROL VALVE FOR FLOW PATH OF DOOR CLOSER); JP2000240349 (DOOR CLOSER); JP2000240350 (SLIDING DOOR CLOSER); U.S. Pat. No. 6,138,412 (Door Opener And Closer); EP1051558 (BLOCKING DEVICE FOR A DOOR PRIVIDED WITH A DOOR CLOSER); AU2106400 (Door Closer); AU1792300 (Door Closer Mounting Bracket With Screw Holders); U.S. Pat. No. 6,131,967 (Door Lock Assembly For Automotive Vehicles); KR172493Y (DOOR-CLOSER); GB2349173 (Door Closer); WO0061903 (VERTICAL TYPE DOOR CLOSER); U.S. Pat. No. 6,125,505 (Door Closer And Mounting Bracket); KR165486Y (VERTICAL TYPE DOOR CLOSER); EP1042576 (DOOR CLOSER); CN2397236U (Improved Closer For Door); CN1266938 (Lamp Tube Type Noiseless Door Closer); WO0052291 (DOOR CLOSERS); DE19857295 (Automatic Door Closer Has Spring Loaded Sliding Piston Provided With Compression Fitted Minimum Play Linear Sliding Bearing); JP2000204841 (DOOR CLOSER); FR2790275 (Door Closer Has Lock Assembly Masked By Strip With Pivot Rib And Pull Handle); WO0047854 (INSTALLATION TEMPLATE FOR A DOOR CLOSER); EP1030140 (Tray Of Adjustable Capacity For Refrigerator Doors); CN87207062U (AUTOMATIC DOOR CLOSER); U.S. Pat.

No. 6,092,334 (Door Locking Device For A Door Closer Having A Fire Actuated Mechanism For Unlocking The Door Locking Device); CN85200341U (AN AUTOMATIC DOOR CLOSER); JP2000192726 (DOOR CLOSER); JP2000186460 (DOOR CLOSER); CN1219214 (DOOR CLOSER UNIT); WO0042283 (DOOR CLOSER); WO0042282 (DRIVE); WO0042281 (DOOR CLOSER MOUNTING BRACKET WITH SCREW HOLDERS); WO0037755 (ARRANGEMENT AT A DOOR LOCKING SYSTEM FOR A MOTOR VEHICLE); WO0036255 (DOOR CLOSER); WO0032897 (DOUBLE-WING DOOR, ESPECIALLY A FIRE PROTECTION DOOR); WO0011297 (DOOR CLOSER); WO0008285 (DOOR CLOSER); CN2377322U (Two-Position Door Closer); JP2000160925 (SAG REMOVING DEVICE FOR WIRE IN CLOSER OF SLIDING DOOR); DE19932291 (Car Door Lock Of Pre-Alerted Swivel Catches Has Catch Axes Eccentric To Their Bearer Axes Using Counterpart Locking Component Opposing End); DE19922916 (Door Closer With Drive For Closing Door Casement Has Spring Piston And Damping Piston Mounted Rotationally Secured Relative To Stroke Cam); DE19901769 (Sequential Door Closer For Double Doors Has Control Device For Controlling Blocking Device Of Overlapping Door Panel Only On Each N-Th One); DE19901517 (Door Closer For Automatically Closing Doors Has Hollow Compensating Body Mounted In Pressure Compensating Chamber Of Piston Cylinder Unit); JP2000130005 (DOOR CLOSER); JP2000104431 (DRIVE CONTROL DEVICE FOR DOOR CLOSER DEVICE); KR205613 (AUTOMATIC STOPPER DEVICE AND DOOR CLOSER FOR FIRE PREVENTION); DE19857297 (Door Closer.); RU2133861 (THRUST REVERSER FOR TURBOJET ENGINE WITH DOORS CONNECTED TO FRONT PANEL FORMING INTAKE); KR149513Y (A SIDE CLOSER FOR EMERGENCY DOOR OF FIRE-PROOF SHUTTER); KR149512Y (A SIDE CLOSER FOR EMERGENCY DOOR OF FIRE-PROOF SHUTTER); KR8603003Y (DOOR CLOSER); KR199991 (DOOR CLOSER); DE19855425 (Swing Fire Doors Have Door Closers With Sliding Blocks At The Closer Arms On A Horizontal Guide At The Door Frame And A Lock For The . . . ); CN1248660 (Multi-Purpose Door Closer Installed Behind Door); U.S. Pat. No. 6,061,964 (Portable Remote Controlled Door Closer); AU5623899 (Door Closer); AU4139599 (Door Closer); DE19856285 (Building Break E.G. Window Or Door Closer Hinge Has Axis In Tubular Sleeve Containing Coaxial Hinge Roller Axis Plus Hinge Axis End Cover); DE19855402 (Twin Leaf Fire Door For Building Has Flap, Servo And Locking Strips Mounted Under Common Cover); U.S. Pat. No. 6,049,444 (Rotatable Door And Door Opening Mechanism For A Cartridge); U.S. Pat. No. 6,047,440 (Non-Rotating Pinion Cap); GB2343713 (Door Closer: Mounting Bracket); GB2343712 (Door Closer: Mounting); GB2343711 (Door Closer: External Cover For Pinion Shaft); CN2363031U (Door Bottom Gap Automatic Closer); CN2363011U (Wind-Proof Door Closer); AU1679488 (DOOR CLOSER); EP0993535 (DEVICE FOR TRANSMITTING MECHANICAL CONTROL MOVEMENTS AND/OR ELECTRIC SIGNALS BETWEEN A DOOR ACTUATING DEVICE AND A DOOR CLOSER DEVICE OF A); DE19848071 (Locating Structure Of Oil Pressure Door Closer Is Composed Of A Locating Plate, A Main Body And A Number Of Fastening Pins); AU3443599 (Hinge Type Automatic Door Closer); CN2361797U (Full-Automatic Door Closer For Fire-Proof Door); JP2000054723 (METHOD AND DEVICE FOR REDUCING OPENING OF DOOR CLOSER); JP2000045624 (DOOR CLOSER); CN2357089U (Improved Positioning Structure For Oil Hydraulic Door Closer); U.S. Pat. No. 6,032,330 (Locating Structure Of Oil Pressure Door Closer); U.S. Pat. No. 6,029,403 (Method For The Sealed Mounting Of A Window-Lifter Mechanism In A Vehicle Door And Door For The Application Of This Method); DE19901234 (Door Closer For Building Has Adjustable Spacing Between Drive Shaft And Follower Roller); DE19842568 (Drive Mechanism For Door Closer Preferably Consists Of Piston Cylinder Unit In Housing, Energy Accumulator, And Driven Shaft); JP2000017944 (ADJUSTMENT MECHANISM FOR STOPPING ANGLE OF DOOR CLOSER); JP2000017943 (ADJUSTMENT MECHANISM FOR STOPPING ANGLE OF DOOR CLOSER); JP2000008696 (STOP ANGLE ADJUSTING MECHANISM FOR DOOR CLOSER); U.S. Pat. No. 6,024,137 (Automatic Fueling System And Components Therefor); KR166651 (DOOR CLOSER); ZA9002428 (SLIDING DOOR CLOSER); DE19834889 (Door Closer Has Structured Body Surfaces In A Lightweight Casting To Give A Compact And Visually Attractive Unit); U.S. Pat. No. 6,011,468 (Garage Door Alarm); CN2343292U (Door Closer); CN2342081U (Hinge Type Closer For Door Bottom Seam); AU3350399 (Device In Connection With Mounting Of A Door Closer); AU713769 (A Motorised Door Opener And Closer And A Shuttle Therefor); JP11336424 (SLIDING DOOR CLOSER); JP11324474 (DOOR CLOSER); JP11336416 (CLOSER FOR AUTOMATIC CLOSING USED ESPECIALLY IN VEHICLE DOOR); CN1230624 (Hydraulic Damping Door Closer); U.S. Pat. No. 6,003,568 (Automatic Fueling System And Components Therefor); KR9304980Y (PISTON ASSEMBLY IN DOOR CLOSER); KR9304468Y (DOOR CLOSER); KR9301037Y (ARM IN DOOR CLOSER); KR9301036Y (ATTACHMENT DEVICE IN DOOR CLOSER); KR9301035Y (DOOR CLOSER); KR9203850Y (DOOR CLOSER); KR9108391Y (DOOR CLOSER); KR9107346Y (DOOR CLOSER); KR9104710Y (DOOR CLOSER); KR9101528Y (DOOR CLOSER (KR9010938Y (DOOR CLOSER); KR9009664Y (DOOR CLOSER); KR9009663Y (DOOR CLOSER); KR9000691Y (SPRING PRESS CONTROL DEVICE FOR DOOR CLOSER); KR8800141Y (BRAKING DEVICE OF DOOR-CLOSER); KR8703627Y (0-SHAPE RING OF DOOR CLOSER FOR PREVENTING OF A OIL FLOW); EP0972902 (Door Closer With Reduced Dimensions); DE19831783 (Door Closer With Automatic Closing Action For Swing Doors Has Two Force-Transferring Rods Mounted In Swivel Bearing On One Side And . . . ); JP11324484 (CLOSER FOR TOP-RAILED SLIDING DOOR); JP11315662 (CLOSER FOR SLIDING DOOR); JP11324487 (LINEAR MOTOR TYPE DOOR CLOSER); JP11324450 (DOOR CLOSER DEVICE FOR VEHICLE); JP11324489 (AUTOMATIC DOOR CLOSER); JP11324482 (DOOR CLOSER); KR9301633 (POWERED SLIDING DOOR OPENER/CLOSER FOR VEHICLES); KR9301488 (DOOR CLOSER); KR9301487 (DOOR CLOSER); KR8503284Y (DOOR CLOSER); KR8200088U (DOOR CLOSER); KR8001195U (DOOR CLOSER); KR8000602U (DOOR CLOSER OF A SIGNAL APPARATUS BOX FOR RAILROAD); U.S. Pat. No. 5,992,444 (Control Device For Door Closer); DE19828034 (Door Or Window Blind Frame Closure Plate With Receiver Groove); JP11303495 (DOOR CLOSER); JP11303501 (DOOR CLOSER STOPPING ANGLE-ADJUSTING MECHANISM); JP11311055 (SILENCING MECHANISM FOR SLIDING DOOR CLOSER DEVICE); JP11303483 (DOOR CLOSER DEVICE FOR CAR); WO9961739 (WINDOW AND DOOR CLOSING MECHANISM); WO9961729 (VEHICLE DOOR LATCH); AU3246999 (Blocking Device For A Door Provided With A Door Closer); JP11270220 (DOOR CLOSER); U.S. Pat. No. 5,971,514 (Cabinet Door Prop Unit); GB2337290 (Door Closer Ensuring Firm Door Abutment: Walk-In Baths); EP0956415 (DOOR CLOSER FOR GENERATING A SPEED-INCREASING LEAP DURING THE CLOSURE PHASE); CN1219214T (Door Closer Unit); WO9954583 (HINGE TYPE AUTOMATIC DOOR CLOSER); KR8500947 (DOOR CLOSER); U.S. Pat. No. 5,956,806 (Apparatus For Automatically Closing A Swing Door); IL56851 (DOOR CLOSER WITH ASSIST OR DOOR OPERATING FEATURES); IL23508 (HYDRAULIC DOOR CLOSER); WO9949166 (DEVICE IN CONNECTION WITH MOUNTING OF A DOOR CLOSER); U.S. Pat. No. 5,951,069 (Door Closing Apparatus); U.S. Pat. No. 5,946,858 (Collapsible Window Lift Module With Diagonal Structural Link); U.S. Pat. No. 5,943,736 (Door Closer); NZ194288 (DOOR CLOSER); SG27183G (DOOR CLOSER); JP11166355 (SLIDING DOOR CLOSER DEVICE); JP11141202 (VEHICLE DOOR CLOSER DEVICE); JP11141226 (JOINT DEVICE BETWEEN ARMS IN DOOR CLOSER); JP11190165 (DOOR CLOSER AND DOOR CLOSER INSTALLING TOOL AND METHOD); JP11159238 (DOOR LOCKING DEVICE FOR DOOR CLOSER); JP11125059 (DOOR CLOSER); EP0941947 (Bulk Material Container With Hinged Opening Door Pivotable About An Axis); NZ222866 (CHECKABLE POWER ACTUABLE STAY FOR A SWINGING DOOR WITH A DOOR CLOSER); JP11093501 (DOOR CLOSER); JP11104058 (STOPPER/LATERAL SLIP PREVENTIVE DOOR CLOSER/SLIP PREVENTION WITH SHOE WIPER/SHOE SCRATCHER/SHOE MAT AND ITS MANUFACTURE); WO9942687 (ELECTRICALLY CONTROLLED LOCK FOR A SAFE); NZ205385 (PNEUMATICALLY DAMPED SWING DOOR CLOSER: STOP MECHANISM TO HOLD DOOR IN FIXED POSITION); WO9939069 (BLOCKING DEVICE FOR A DOOR PROVIDED WITH A DOOR CLOSER); CN2318360U (Closer Or Opener For Door); DE19901773 (Blocking Device For A Door Provided With A Door Closer); DE19803790 (Fixing Device For Door Provided With Door Closer); NZ329672 (SLIDING DOOR WITH WHEEL AXIALLY ADJUSTABLE AND WHEEL FIXED TO DOOR VIA BRACKET AND MEMBER SLIDABLE RELATIVE TO BRACKET IN PLANE TRANSVERSE T); EP0931895 (Device For Temporarily Closing An Opening Element On A Fixed Part Of A Motor Vehicle Body); U.S. Pat. No. 5,910,075 (Portable Remote-Controlled Door Closer); U.S. Pat. No. 5,901,412 (Top-Mounted Door Closer); EP0922151 (DOOR CLOSER UNIT); EP0919688 (Improvements In Or Relating To Valves); NZ195655 (DOOR CLOSER); NZ194125 (DOOR CLOSER OVERLOAD CURRENT REVERSES MOTOR); NZ193179 (DOOR CLOSER WITH FLUID FILLED DAMPER); NZ191931 (ADJUSTMENT DEVICE FOR ELASTIC DOOR CLOSER); NZ181676 (DOOR CLOSER:HYDRAULIC SYSTEM CONTROLS RATE OF CLOSURE); JP11081788 (DOOR CLOSER); JP11050736 (DOOR CLOSER); JP11050739 (STOPPING DEVICE OF DOOR CLOSER); U.S. Pat. No. 5,867,866 (Door Hinge With A Built-In Damper); U.S. Pat. No. 5,864,987 (Window Regulator With Improved Glider Assembly); U.S. Pat. No. 5,864,920 (Door Closer For The Non-Fire Side Of A Fire-Door Safety Installation); DE19734401 (Door And Window Closer Gas Spring); U.S. Pat. No. 5,862,630 (Door Closer); U.S. Pat. No. 5,862,569 (Door Closer Holding Plate); WO9902810 (DOOR CLOSER FOR GENERATING A SPEED-INCREASING LEAP DURING THE CLOSURE PHASE); WO9901635 (DEVICE FOR TRANSMITTING MECHANICAL CONTROL MOVEMENTS AND/OR ELECTRIC SIGNALS BETWEEN A DOOR ACTUATING DEVICE AND A DOOR CLOSER DEVICE OF A); FR2766513 (Hidden Hinge For Door Or Window Frame); WO9900574 (ARRANGEMENT FOR CONTROLLING AN ANGULARLY MOVABLE MEMBER); U.S. Pat. No. 5,855,039 (Delay Door Closer); WO9900573 (ARRANGEMENT FOR CONTROLLING AN ANGULARLY MOVABLE MEMBER); U.S. Pat. No. 5,850,671 (Door Closer); EP0889190 (Control Device For Door Closer); DE19728967; JP10325276 (DOOR CLOSER); JP10330061 (WEIGHT GUIDE OF DOOR CLOSER DEVICE); DE19725355; U.S. Pat. No. 5,845,360 (Door Closer Hold-Open Clip); AU6635998 (Door Closer Unit); JP10292720 (INDOOR DOOR CLOSER); JP10292722 (JOINT DEVICE BETWEEN ARMS IN DOOR CLOSER); JP10280772 (DOOR AUTO-CLOSER); U.S. Pat. No. 5,832,562 (Door Closer); U.S. Pat. No. 5,832,561 (Automatic Door Closer And Process For Assembly Of Same); U.S. Pat. No. 5,829,508 (Door Closer And Method); U.S. Pat. No. 5,829,097 (Hold Open Control For A Door Closer); FR2763104 (Connector For Mechanical Linkage Rod For Vehicle Door Closer); JP10266669 (VEHICLE DOOR CLOSER DEVICE); JP10266668 (DOOR CLOSER DEVICE FOR VEHICLE); JP10266667 (DOOR CLOSER DEVICE FOR VEHICLE); DE19717817 (Hydraulic Door Closer); JP10252345 (SLIDING DOOR CLOSER WITH PRESSING PART); WO9844230 (PORTABLE REMOTE CONTROLLED DOOR CLOSER); NZ272391 (TUBE FOR DOOR CLOSER; WITH END CLOSURES FITTED TO TUBE BY PRESSING TO INWARDLY DEFORM TUBE); GR61128 (DOOR CLOSER); DE19715270 (Door-Closer Driving Mechanism); U.S. Pat. No. 5,813,282 (Powered Sliding-Door System And Actuating Devices For The Same); DE19714002 (Height Adjustable Door Stop Buffer For Especially Motor Vehicle Door); U.S. Pat. No. 5,809,697 (Door Closer); EP0867587 (Closure Sequence Controller For A Double-Wing Door); JP10246047 (AUTO-CLOSER OF DOOR); U.S. Pat. No. 5,806,246 (Powered Sliding-Door System And Actuating Devices For The Same); 1E49290 (DOOR CLOSER); WO9839543 (DOOR CLOSER UNIT); U.S. Pat. No. 5,802,670 (Door Closer); GB2323409 (Door Closer); FR2760780 (Hydraulic Damper Door Closer); EP0863286 (Closer For A Door Or The Like); JP10220102 (FREE STOP MECHANISM OF DOOR CLOSER); JP10220101 (DOOR CLOSER FOR GATE DOOR); JP10196212 (SLIDING DOOR CLOSER); JP10196211 (DOOR CLOSER FOR DOUBLE HINGED DOOR); EP0856628 (Door Closer); JP10184180 (DOOR CLOSER); GR97300007T (DOOR CLOSER); GR97300006T (AUTOMATIC DOOR CLOSER AND PROCESS FOR MOUNTING THE SAME); CN2262595U (Door Wing Closer); JP10159432 (DOOR CLOSER); JP10159434 (DOUBLE SWINGING DOOR CLOSER); JP10159433 (DOOR BUILT-IN TYPE DOUBLE SWINGING CLOSER); CN2257566U (Multipurpose Hydraulic Speed-Regulation Automatic Door Closer); JP10131604 (DOOR CLOSING SPEED REGULATING VALVE FOR DOOR CLOSER); JP10131603 (DOOR CLOSING SPEED ADJUSTING VALVE FOR DOOR CLOSER); JP10131581 (DOOR CLOSER DEVICE); U.S. Pat. No. 5,752,343 (Universal Garage Door Closer); EP0846828 (Device For Controlling The Closure Sequence Of Double-Wing Doors); U.S. Pat. No. 5,749,122 (Interior Door Closer And Method);

SK135196 (DOOR CLOSER); SK135096 (AUTOMATIC DOOR CLOSER AND PROCESS FOR MOUNTING THE SAME); JP10121835 (STOP MECHANISM FOR DOOR CLOSER); JP10115148 (DOOR CLOSING SPEED CONTROL VALVE FOR DOOR CLOSER); JP10121834 (MOUNTING PART STRUCTURE FOR DOOR CLOSER); JP10115147 (DOOR CLOSER HAVING TEMPERATURE REGULATING FUNCTION); GB2319555 (Cavity Closer With Reversible Spacer Element); JP10102871 (DOOR CLOSER DEVICE); JP10102870 (DOOR CLOSER DEVICE); JP10102869 (DOOR CLOSER DEVICE); U.S. Pat. No. 5,741,034 (Electromagnetic Door Holder Apparatus); EP0841452 (Door Closer With An Energy Storage Device For Closing The Door Wing); JP10082244 (SLIDING DOOR CLOSER); U.S. Pat. No. 5,727,348 (Portable Remote Controlled Door Closer); U.S. Pat. No. 5,727,286 (Door Closer With A Pneumatic Dashpot); GB2317918 (Cavity Closer/Window Frame Fixing Clip); JP10037585 (DOOR CLOSER); JP10054164 (DOOR CLOSER DEVICE); U.S. Pat. No. 5,722,203 (Prehung Door Installation Aid); JP10025956 (DOOR CLOSER); JP10018696 (PIVOT TYPE DOOR CLOSER); EP0826858 (Hold-Open Device For A Door); GB2316126 (Door Closer: Holding Door Open); GB2315810 (Door Closer For The Non-Fire Side Of A Fire-Door Safety Installation); GB2315809 (Door Closer For The Non-Fire Side Of A Fire-Door Safety Installation); GB2315808 (Door Closer For The Non-Fire Side Of A Fire-Door Safety Installation); DE19719324 (Fixing Device For Door With Upper Door Closer); U.S. Pat. No. 5,709,009 (Door Closer For The Non-Fire Side Of A Fire-Door Safety Installation); JP9317315 (DOOR CLOSER); U.S. Pat. No. 5,706,551 (Door Closers And Dampers Primarily For Door Closers); JP9296652 (DOOR CLOSER DEVICE); JP9291737 (DOOR CLOSER DEVICE); JP9291736 (DOOR CLOSER DEVICE); JP9291735 (DOOR CLOSER DEVICE); JP9273353 (DOOR CLOSER
JP9287336 (DOOR CLOSER DEVICE FOR CAR); JP9264092 (DOOR CLOSER WITH DOOR OPENING ANGLE LIMITER); GB2314049 (Vehicle Interior Trim Member); U.S. Pat. No. 5,687,451 (Revolving Door Device); JP9228736 (CONTROL DEVICE FOR SLIDE DOOR CLOSER DEVICE); EP0808983 (Door Closer); EP0807741 (Cabinet Door Prop Unit); U.S. Pat. No. 5,680,674 (Device For Controlling The Movement Of A Wing); JP9184355 (DOOR CLOSER STOPPER); U.S. Pat. No. 5,676,459 (Vibration-Tolerant Lamp Mounting Assembly); WO9737099 (WINDOW REGULATOR WITH IMPROVED GLIDER ASSEMBLY); ZA8001593 (DOOR CLOSER); ZA7904400 (SLIDING DOOR STARTER AND CLOSER); U.S. Pat. No. 5,673,175 (PCI Expansion Card Double-Door Retainer); DE19614467 (Adjustable Door For Buildings); DK241387 (Piston And Cylinder Assembly With A Packing Ring In A Recessed Bearing, And Associated Packing Ring); U.S. Pat. No. 5,659,925 (Door Closer Holding Mechanism); U.S. Pat. No. 5,657,511 (Piston-Type Door Closer With Adjustable Closing Speeds); DE19607878 (Revolving Door Drive With Hydraulic Closure Mechanism); JP9112123 (SPEED ADJUSTMENT DEVICE IN DOOR CLOSER AND SPEED ADJUSTMENT METHOD); EP0789127 (Object Sensor System For Automatic Swing Door); RU2074943 (AUTOMATIC DOOR CLOSER); CN2152881U (HORIZONTALLY PULLING TYPE AUTOMATIC DOOR CLOSER); CN2099820U (CRANK ARM HINGE OPENING/CLOSING TYPE AUTOMATIC CLOSER FOR DOOR); CN2089971U (CLOSER AND OPENER OF AUTOMATIC DOOR WITH DOUBLE SRABLE STATE); DE19547683 (Door Lock Closer); U.S. Pat. No. 5,630,248 (Door Closer With Semi-Automatic Latching); DE19606204 (Electromechanical Restraint For Door With Automatic Door Closer); DE19540506 (Automatic Door Closer With Shafted Rod Off Spring); DE19540505 (Automatic Door Closer With Damped Rod Movement); U.S. Pat. No. 5,529,148 (Automatic Brake And Hold Mechanism For Sliding Rods); U.S. Pat. No. 5,519,988 (Narrow Row Cotton Picker And A Row Unit Therefor); U.S. Pat. No. 5,515,649 (Automatic Door Operator); U.S. Pat. No. 5,510,686 (Automated Garage Door Closer); U.S. Pat. No. 5,379,033 (Remote Control Device); U.S. Pat. No. 5,131,188 (Automatic Return Mechanism For Sliding Door Or Window); U.S. Pat. No. 5,016,317 (Lightly-Operating Automatic Door Closer With Double Cylinders); U.S. Pat. No. 5,004,148 (Automatic Flag For Rural Mailbox); U.S. Pat. No. 4,953,260 (Automatic Door Closer Having An Adjustable Torsion Spring And Configured End Fittings); U.S. Pat. No. 4,894,883 (Door Closers); U.S. Pat. No. 4,845,811 (Automatic Door Closer Having An Adjustable Torsion Spring And Configured End Fittings); U.S. Pat. No. 4,756,051 (Door-Closer Hinge With Rotary-Movement Shock Absorber); U.S. Pat. No. 4,660,250 (Door Closer); U.S. Pat. No. 4,658,545 (Automatic Door Opener And Closer); U.S. Pat. No. 4,639,969 (Door Closer Mechanism); U.S. Pat. No. 4,501,090 (Automatic Door Operator For Swing Doors); U.S. Pat. No. 4,483,043 (Automatic Door Closer); U.S. Pat. No. 4,460,030 (Collapsible Garage Door); U.S. Pat. No. 4,376,323 (Automatic Door Closer); U.S. Pat. No. 4,366,595 (Door Closer); U.S. Pat. No. 4,357,732 (Automatic Door Closer Kit); U.S. Pat. No. 4,349,939 (Automatic Door Closer); U.S. Pat. No. 4,289,995 (Electric Door Operator With Slip Clutch And Dynamic Braking); U.S. Pat. No. 4,234,996 (Automatic Door Closer Constructed For Releasably Holding A Door In A Predetermined Partly Open Position); U.S. Pat. No. 4,067,084 (Automatic Door Closer); U.S. Pat. No. 4,054,008 (Automatic Door Opening Arrangement); U.S. Pat. No. 3,874,117 (ELECTRIC DOOR OPENER); U.S. Pat. No. 3,787,924 (AUTOMATIC DOOR CLOSER WITH SUBSTANTIALLY PRISM-SHAPED HOUSING); U.S. Pat. No. 3,776,611 (AUTOMATIC DOOR CLOSER); U.S. Pat. No. 3,724,023 (AUTOMATIC DOOR CLOSER); U.S. Pat. No. 3,699,608 (AUTOMATIC DOOR CLOSER); U.S. Pat. No. 3,668,737 (AUTOMATIC DOOR CLOSER); U.S. Pat. No. 3,518,715 (AUTOMATIC HINGE-MOUNTED DOOR CLOSER); U.S. Pat. No. 3,474,485 (AUTOMATIC UNIVERSAL DOOR CLOSER); U.S. Pat. No. 3,409,341 (Automatic Door Closer); U.S. Pat. No. 3,147,034 (Automatic Vehicle Door Window Closer); U.S. Pat. No. 3,108,315 (Automatic Door Closer, Especially Loft Door Closer); U.S. Pat. No. 3,098,259 (Automatic Door Closer); U.S. Pat. No. 3,078,500 (Automatic Door Closer And Check Mechanism); U.S. Pat. No. 2,945,255 (Adjustable Hold-Open Guide Rail For Automatic Door Closer); U.S. Pat. No. 2,177,059 (Thermally Controlled Automatic Door Closer); U.S. Pat. No. 2,059,833 (Automatic Safety Overhead Door Closer); U.S. Pat. No. 1,908,706 (Automatic Door Closer); U.S. Pat. No. 1,868,149 (Automatic Door Opener And Closer); U.S. Pat. No. 1,786,782 (Automatic Door Closer); U.S. Pat. No. 1,714,887 (Automatic Door Closer); U.S. Pat. No. 1,705,334 (Automatic Door Closer); U.S. Pat. No. 1,599,729 (Automatic Electric Door-Closer Structure); U.S. Pat. No. 1,590,690 (Automatic Door Closer And Lock); U.S. Pat. No. 1,455,691 (Automatic Door Closer); U.S. Pat. No. 1,346,366 (Automatic Door-Closer); GB2293198 (A Door Latch Having A Serrated Striker Element); GB2257590 (MICROWAVE OPERATED AUTOMATIC DOOR); GB2214566 (Door Actuator); GB2204093 (Automatic Door Closer); GB2192426 (AUTOMATIC DOOR CLOSER); GB2190954 (Automatic Door Closer);

GB2082248 (AUTOMATIC DOOR CLOSER); GB1400661 (AUTOMATIC DOOR CLOSER); FR2738865 (Door Closer To Facilitate The Automatic Closing Of A Door); WO9626344 (AUTOMATIC DOOR CLOSER AND PROCESS FOR MOUNTING THE SAME); WO9532145 (AN ANTI-CRUSH SAFETY DEVICE FOR AUTOMATIC DOORS, IN PARTICULAR FOR LIFTS AND ELEVATORS HAVING TRANSPARENT DOORS); WO9502107 (REVOLVING DOOR DRIVE); WO8809860 (AUTOMATIC DOOR-CLOSER); EP0757742 (AUTOMATIC DOOR CLOSER AND PROCESS FOR MOUNTING THE SAME); EP0635613 (A Sliding Door Stopper Device.); EP0390178 (Sliding Door Closer.); EP0368871 (AUTOMATIC DOOR-CLOSER.); EP0252554 (Automatic Door Closer.); EP0170940 (Operating Process Of A Door Closer, And Door Closer.); EP0166285 (Automatic Door Closer.); EP0137861 (Automatic Door Closer.); EP0120489 (Time-Controlled Window Closer.); EP0068963 (Automatic Door Closer Incorporating Braking Means.); DE19506355; DE19501565 (Mechanical Assembly System For Producing Door Or Window Drive); DE19500844 (Door Drive Esp. Door Closer For Automatic Door Closing And Manual Opening Of Door); DE4323152 (Swing-Door Drive); DE4323151 (Swing-Door Drive); DE4101640 (Automatic Door Closing Device With Hydraulic Damper—Has Pressure Compensating Chamber For Damping Fluid); DE4002889 (Body For Automatic Door Closer—Is Formed From Aluminum Or Plastics Extrusion); DE3906356 (Door Closer); DE3839188 (Lock For One-Handed Operation); DE3527287 (Automatic Closing System For Fire-Proof Cabinets); DE3411189 (Automatic Door Closer); DE3320609 (Automatic Door Closer With Electrohydraulic Stop Device); DE3315913 (Automatic Door Closer Having A Hydraulic Stop Device); DE3234319 (Automatic Door Closer); DE3225559 (Automatic Door Closer With A Hydraulic Stop Device); DE3117193 (Time-Controlled Window Closer); DE3116881 (Dynamic Door Closer); CZ278798 (AUTOMATIC DOOR CLOSER); CN2242312U (Automatic Door Closer); CN2213217U (Automatic Closer For Door); CN2193910U (Crankshaft Automatic Door Closer); CN2193909U (Automatic Door Closer); CN2143660U (Multifunction General Automatic Door Closer); AU4481096 (Automatic Door Closer And Process For Mounting The Same); AU1808888 (AUTOMATIC DOOR-CLOSER); CN1083161 (Automatic Door Closer); JP8126714 (DOOR CLOSER WITH AUTOMATIC CLOSING DEVICE); JP52081940 (AUTOMATIC DOOR CLOSER); JP57054684 (AUTOMATIC DOOR CLOSER); JP55022570 (FLAP DOOR AUTOMATIC CLOSER); JP56003777 (AUTOMATIC DOOR CLOSER); JP52121940 (AUTOMATIC DOOR CLOSER); JP57137581 (AUTOMATIC DOOR CLOSER); JP1187278 (AUTOMATIC CLOSER FOR AUTOMOBILE DOOR); JP52087845 (AUTOMATIC DOOR CLOSER).

SUMMARY OF THE INVENTION

One aspect of the present invention provides a power efficient door closing device whose design permits operation without a permanent line power connection, for example, a device whose primary door closing functions are principally powered from the initial opening of the door.

Another aspect of the present invention provides a door closing device which stores door closure energy, and comprises a lock which prevents closure based on a doorway sensor, e.g., a sensor for detecting a subsequent person passing though the door.

A further aspect of the invention provides an automatic or semiautomatic door control which is energy and space efficient, low cost, and which is readily installed without requiring permanent line wiring, while providing the benefits of an electronic control. The control therefore derives operational energy from manually initiated door movement, which is extracted and later employed to operate the control, close the door, or both.

According to a preferred aspect of the invention, a door closer presents a counter force to door opening, and thus tends to maintain the door in a closed position, unless restrained. This serves two purposes; first, the force counters wind, other air pressure differences, and incidental jarring to change the position of the door. Second, the energy exerted by moving the door against the counter force is preferably captured and efficiently reutilized in a controlled manner. In contrast to simple hydraulic door closers, an intelligent control is provided which restrains door closure based on a sensor, rather than a simple immediate or time delayed closure.

Known sensors for detecting persons in doorways, such as pad sensors in the walkway, passive infrared sensors, ultrasonic sensors, microwave sensors, optical sensors (imaging or non-imaging), or the like may be used, alone or in combination. Preferably, however, the sensor is part of or operates in close proximity to a door closer mechanism, and does not require separate wiring to a distant location.

The sensor and control system typically requires a power source, which may be a battery, solar power, wired power, an energy draw from the door opening, or the like. In many instances, the control will be capable of operation at low power draw, and therefore battery power for the control will be possible. The use of a battery for powering the electronic control allows a reliable power source independent of door operation. On the other hand, powering large or power intensive actuators with a battery will likely result in short operating life and frequent service to replace the battery. Therefore, it is preferred that any power intensive actuators draw energy from the door operation. In low duty operation environments, such as homes or some offices and closets, battery power is a feasible option for actuator power, especially lithium batteries.

Since the device is operative principally to delay closure of the door, the sensor need only be operative while the door is open, and thus the duty cycle of operation will typically be small. Further, since the control system need only block closure, a single valve or solenoid, magnetic clutch, or other device, may be used, requiring only a small amount of power.

The device preferably mounts in the place of a known type of door closing device, to the door and door frame, and thus does not require a specialized installation. Other mounting options include in a space within the door, within the door frame, or as a part of one or more hinges.

In a preferred design, a door closing mechanism includes a hydraulic cylinder damper coupled with a spring, acting together to slowly close the door. According to the present invention, a controllable valve is provided to selectively block flow of hydraulic fluid, halting the closure of the door. This valve is, for example, a latching solenoid actuator (i.e., drawing power only when switching states) acting on a piston having a cross-drilled hole. In one position, fluid flows through the hole. In the other position, the hole is not aligned with corresponding flow passages, and no flow occurs. As can be seen, the power required by the system is typically the power to operate the electronic control, the power required to operate the sensor, and the power require to operate the actuator. Assuming the door is operated 4 times per day over the course of a year, there are less than 1,600 cycles of operation.

If the system has a quiescent draw of 100 μA, and an operating draw of 1 A for 2 seconds per closure, then the total power for operation over a year will be less than about 2 AH (0.875 AH quiescent plus 0.811 AH active). Therefore, under such use, a primary lithium battery could be employed to power the entire system, with an annual replacement cycle. On the other hand, as the duty cycle increases, the ability to reasonably provide a low maintenance reliable system running off battery power decreases, and power extraction systems become more cost efficient.

A sensor mounted on the door closing device detects whether there is traffic within the doorway. If there is traffic, the door is restrained. Since people are conditioned for dumb (i.e., non-intelligent) door closing devices, and will be tempted to manually hold the door, a visual indicator, such as a blinking light emitting diode (LED) is provided to alert users that the device is operational. When the door is opened, a magneto generator may be operated, which charges a supercapacitor or rechargeable battery. A set of primary back-up batteries may also be provided. Since the magneto operation will damp the opening of the door, the hydraulic cylinder is provided with an asymmetric flow pattern, such that there is little hydraulic damping during door opening, since this would be redundant and would consume power which could be efficiently used by the magneto.

The sensor is preferably a passive infrared sensor system, with sensitivity in both directions (i.e., ingress and egress), as well as a micropower microwave sensor, to detect existence and movement of objects (e.g., by radar techniques including phase shifts, Doppler shift and echo). A control is activated when the door is open, and begins reading sensor data. In a typical case, at least one person will pass through the door after it is opened. Thus, the control awaits this passage. In the rare case that no person passes through, or the sensors fail to read the person, the control allows the door to close after a preset period. If the control is inoperative, the door defaults to a standard mode that emulates a traditional door closing device. Thus, the control is preferably fail-safe. In addition, it is also possible for the control to provide additional functions, such as door locking, fire alarm mode, RFID and theft prevention using RF, magnetic, optical or other known techniques, room occupancy sensing (e.g., for public rest rooms), and wireless communications.

After the first person passes through the door, the control analyzes sensor data to determine whether a second person is passing through the doorway. If so, then the door remains restrained from closing until the doorway is clear. A visual indicator is provided to indicate that the door is restrained, and preferably also indicates when the door is about to begin closing with a different signal, for example a different visual signal and possibly an additional audio signal. A voice or sound sensor system may also be provided to allow the door to be instructed. For example, a speaker independent voice recognition could be programmed to detect a number of variants of "hold door!", including foreign languages. Likewise, an instructed override could also be programmed for "close door!", which would override operation in extenuating circumstances, for example where a dog is meant to be left outside, but follows its master. Likewise, the sensor or control may be adapted or programmed to distinguish between types of operating conditions.

As stated above, in a preferred high duty cycle design, the door opening operates a mechanical to electrical energy transducer, e.g., a magneto. In a typical design, as the door is opened, a gear train rotates an armature within a magnetic field, generating an electrical current. This electrical current is either directly, or through a power converter, used to store charge in a large-valued capacitor or rechargeable battery (or hybrid type device), for subsequent operation of the system. The opening of the door also activates the control, which begins monitoring the sensors. As the door opens, there will typically be a person on one side of the doorway. (If there is no person detected, the system may be programmed to interpret this as a wind gust, and the door opening may be restrained. In this way, the normal closing force may be limited to a level less than the wind gust force). The sensors detect this person, and monitors as he or she passes through the door, and out of the doorway. During this period, the closure is prevented. After the initial person passes through the doorway, the sensors determine whether there is another person entering the doorway. If so, the closing device remains locked open. If not, the valve is released, and the hydraulic closing device allowed to close the door.

In an alternate embodiment, the hydraulic damper is dispensed with, and the magneto serves to damp the opening and closing. The load on the magnetic may be controlled to provide various damping factors. The control, in this case, is preferably a magnetic clutch to stop the armature from rotating, or a solenoid brake operating on a displaceable rod that moves with the door. In this case, in order to extract sufficient energy from a door opening event to complete a subsequent door closing event, the force applied for door opening will generally exceed the door closing force. Otherwise, a supplemental source of power may be provided. For example, in an office ceiling, there are often ballasts for fluorescent lighting. These ballasts emit a substantial amount of magnetic waves, which may be captured by a coil antenna and stored. Likewise, exterior doors may receive sunlight, which may be converted with a solar cell into electric power.

In order to provide resilience against externally applied forces, a bypass or friction plate is provided to prevent damage to the closing device.

A battery backup, for example having alkaline or lithium batteries, is provided in case the charge on the capacitor is insufficient for operation. The audible or visual indicator may provide a low battery indication. These batteries also allow some operation of the device while the door is closed, for example to periodically self-calibrate sensors for a non-operating condition.

It is understood that the present invention therefore provides, according to a first embodiment, an improvement for a standard door closer in the manner of an intelligent control, which, for example, may be retrofitted to existing door closers or form the basis for an improved design. In a second embodiment, an electrical system replaces the traditional hydraulic system to provide improved performance, enhanced control capability, and potentially more cost effective manufacture.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:).

Similar reference characters refer to similar parts or steps throughout the several views of the drawings.

DETAILED DESCRIPTION OF THE PREFERRED EMBODIMENTS

Figure 1:
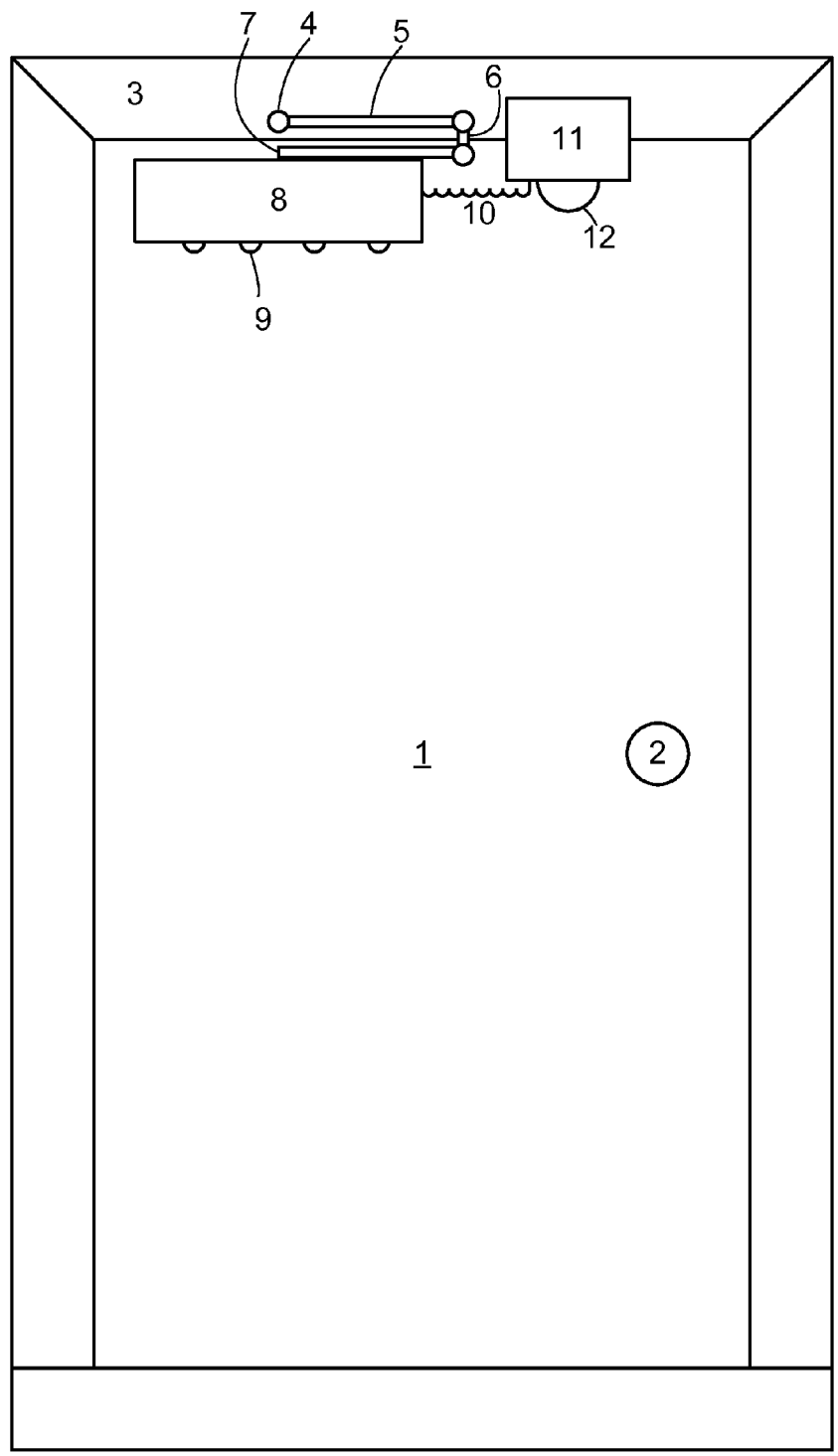
FIG. 1 shows a door-closing device according to a first embodiment of the present invention mounted to a door in a door frame.

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

The invention provides a control system for a passive door closing system to alleviate the problem of the requirement for manual efforts, sometimes significant, in order to overcome the tendency of an automatic door closing mechanism to close the door immediately (or after a preset delay) after being opened. Such door closers are provided to prevent insects and debris from entering a doorway, and to maintain controlled climates separate from uncontrolled climates. The force on the door is typically sufficient to keep the door closed under windy conditions and against possible air pressure differences seeking to open it. Since the door is typically 2.5 feet by 7 feet, even a low 0.05 psi pressure differential is sufficient to create a 126 pound force. Likewise, the door must be damped, since the spring would tend to slam the door closed, and an undamped door when pushed open abruptly might hurt an unseen person on the other side.

A sensor is provided to sense a person in or approaching the doorway, and preferably distinguishes a person leaving the doorway or congregating in the vestibule. These may be distinguished by a motion analysis.

The system is powered by a door opening, which typically provides a significant force exerted over a short period of time. Part of this force is to provide potential energy for the door closing mechanism to later close the door, and part is normally lost in a damping mechanism. According to the present invention, the damping forces may be captured and stored as electrical energy to power the control system.

The control system may be relatively simple: it receives sensor data, and makes a decision as to whether to delay door closure, and then controls an actuator to either close the door or to permit door closure. Other ancillary functions are optional. Since electronic devices have become quite sophisticated, and doors are located in strategic locations, the door closer may be suitable for integration with various electronic systems, including theft prevention, RFID, person recognition, portal inventory, fire alarm condition, alarm or security system sensing and/or control, occupancy sensing, pet control, or the like.

The control system controls an actuator, for example a solenoid valve, clutch/friction plate, electro-rheological phenomenon, catch, or other type of mechanism. Typically, an electronic control system will control an electrical transducer, which is typically an electromagnetic or piezoelectric system. Other possibilities include electrochemical (e.g., hydrolyzing a liquid to produce a gas, which exerts a pressure. To reverse, the gas may be explosively or catalytically recombined), and electrothermal (e.g., heating a shape memory alloy above its transitional temperature to cause a shape reconfiguration).

A backup battery is provided to provide power in case the capacitor discharges or fails to fully charge. For example, if the door is opened very slowly, the voltage generated by the magneto will be insufficient to charge the capacitor. Likewise, a long delay between opening and closing may allow the capacitor to self-discharge.

As shown in FIG. 1, a door 1 is provided in a door frame 3, having a doorknob 2. A door closing mechanism 8 is provided at the top of the door 1, and connected to the door frame 3, by a linkage including arms 5, 7 and hinge 6, held to the door frame by a mount 4. The door closing mechanism 8 includes a system for returning the door to a closed position, a selective control for delaying door closure while a person or object is in the doorway, a sensor housing 11, having a sensor 12 for detecting the presence of a person or object in or near the doorway. The door closing mechanism also include a feedback device, e.g., a set of light emitting diodes (LEDs) 9, which provide an indication that the device is operative to hold the door open, and therefore that it need not be manually held for a next person. These LEDs 9 may also provide indication of a failure condition, such as low battery, watchdog timer timeout, or mechanical or electronic failure.

Figure 2:
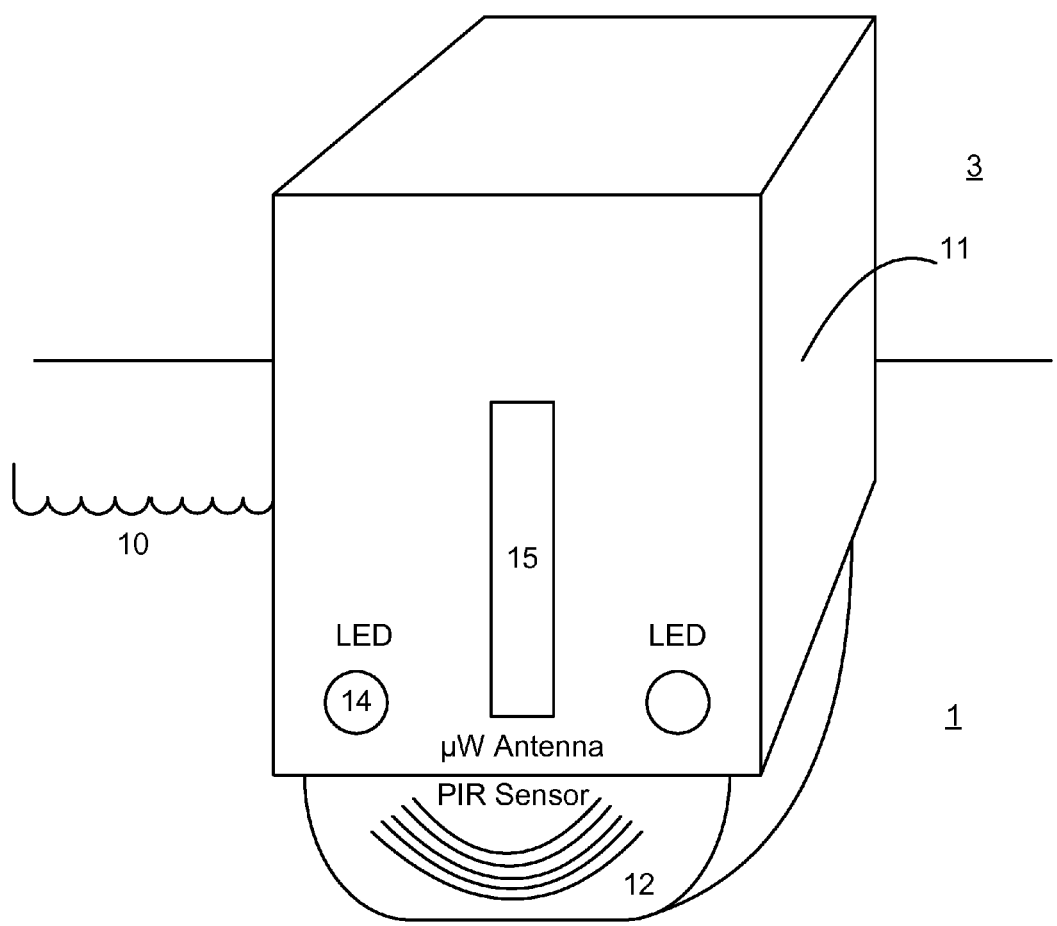
FIG. 2 shows a sensor configuration detail according to the embodiment of FIG. 1.

FIG. 2 shows in greater detail an embodiment of the sensor housing 11, which in this case is separated from the door closing mechanism 8 by a coiled wire 10. In this embodiment, two sensors are provided; a passive infrared (PIR) sensor 13, and a microwave sensor having a microwave antenna 15. The sensor housing 11 may also include a set of LEDs 14, to indicate that the sensor has sensed an object or person, or to otherwise indicate the status of the system. In this case, since the sensor housing is mounted to the door frame 3, it may optionally be wired to receive line power, which may be provided to the door closing mechanism 8 through the coiled wire 10.

It is thus clear that a separation from line power is not a negative limitation on all embodiments of the invention, and in fact, where accessible, line power is a quite efficient power source. However, one of the advantages of the present design is that the operational principles are compatible with non-line powered operation.

In this embodiment, the sensor housing is mounted in predetermined position on the side opposite where the door opens. The sensors 13, 15, are this in fixed position, and may be aligned with the normal path of travel through the doorway. The PIR sensor 13 is sensitive to a change in heat patterns, i.e., infrared wave emissions, through a lens portion, and, for example, includes a sheet of pyroelectric material, such as polyvinylidene fluoride (PVDF). Alternately, the sensor system could include an optical sensor, for example an imaging complementary metal-oxide-silicon (CMOS) or charge coupled device (CCD) sensor. In that case, the LEDs 14 could advantageously provide illumination. Likewise, the LEDs (as laser diodes) could form part of a LIDAR sensor system to detect object range and motion.

The microwave sensor emits a signal through microwave antenna 15. This sensor can detect object presence, range, and/or motion, depending on the control system and implementation. Preferably, it is used to detect object presence and as a Doppler sensor to detect velocity with respect to the antenna sensitivity pattern.

The sensor system is preferably inactive while the door is closed, conserving power. As the door is opened, which may be detected in any suitable manner, the sensor become active, and remain active until the door is closed or is beginning to close. In some cases, the control and infrared sensor may be continually active, since these are relatively low power components. This permits control over operation prior to door opening. For example, the control may lock the door when no sensed person is nearby, but when a person is in the doorway, allow the person to open the door. The control may authenticate the person to implement controlled access, through optical feature recognition, RFID, security token, fingerprint, iris or other biometric recognition technique, voice recognition, password, PIN, or other control technique.

The door opener may receive an optical, magnetic or RF signal to receive control instructions from another system, and may provide a platform for the mounting of antennas for wireless networks and the like.

Figure 3:
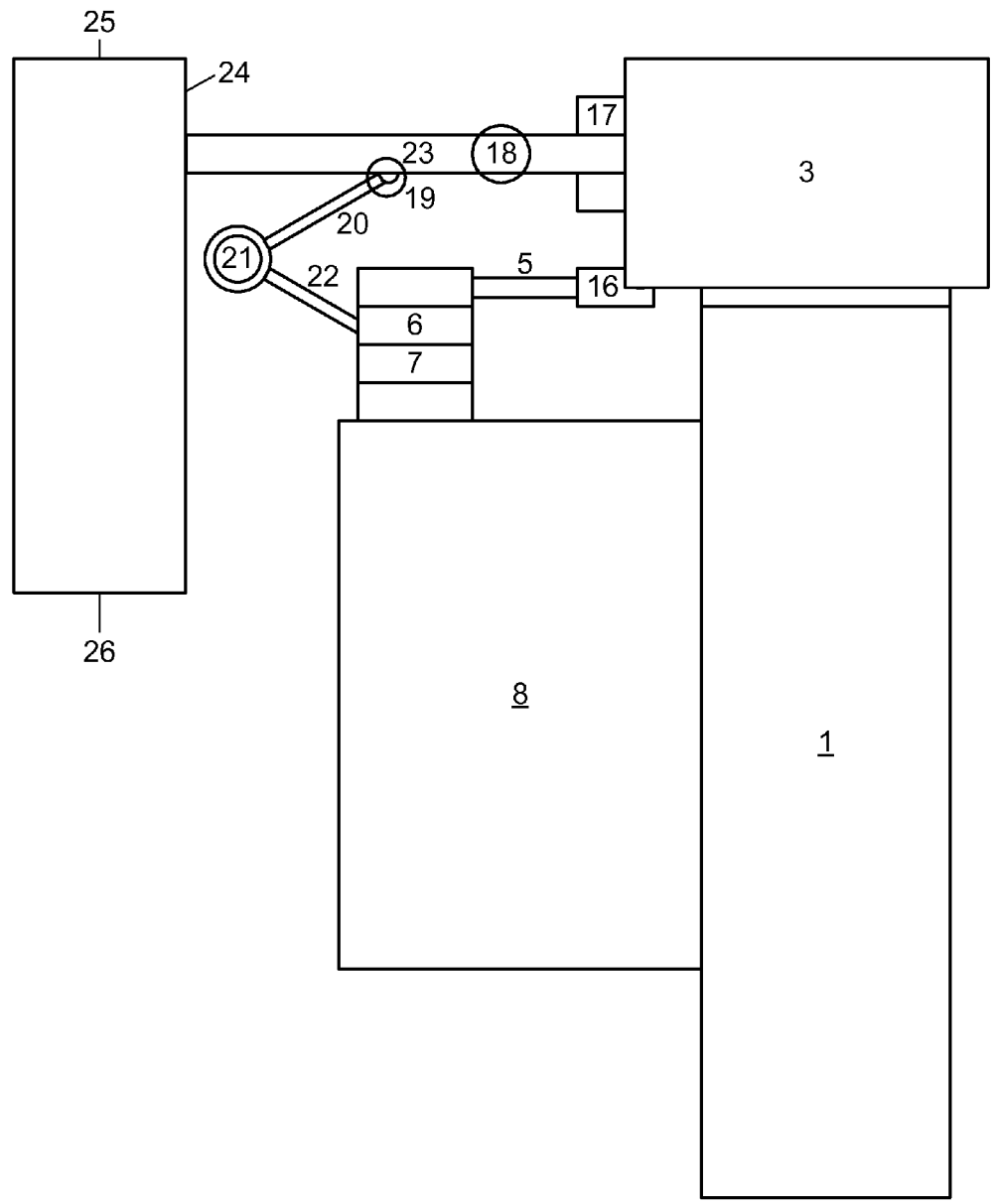
FIG. 3 shows a side view of a second embodiment of the present invention, having a hinged sensor module.

FIG. 3 shows an alternate embodiment of the invention, in which the sensor housing 24 is mounted on an arm 23 hinged by hinge 18 to lift up with respect to mounting 17 as the door is closed and down as the door is opened. This embodiment extends the faces 25, 26 of the sensor below the top of the door frame 3 to sensor objects and people in the doorway. The arm 23 is connected though arms 20, 22 and hinge 21 to the arm 5 of the door closing mechanism. FIG. 3 also shows that the mount 4 may be replaced with an "L" shaped member 16 to fit around a corner of the door frame 3.

Figure 4:
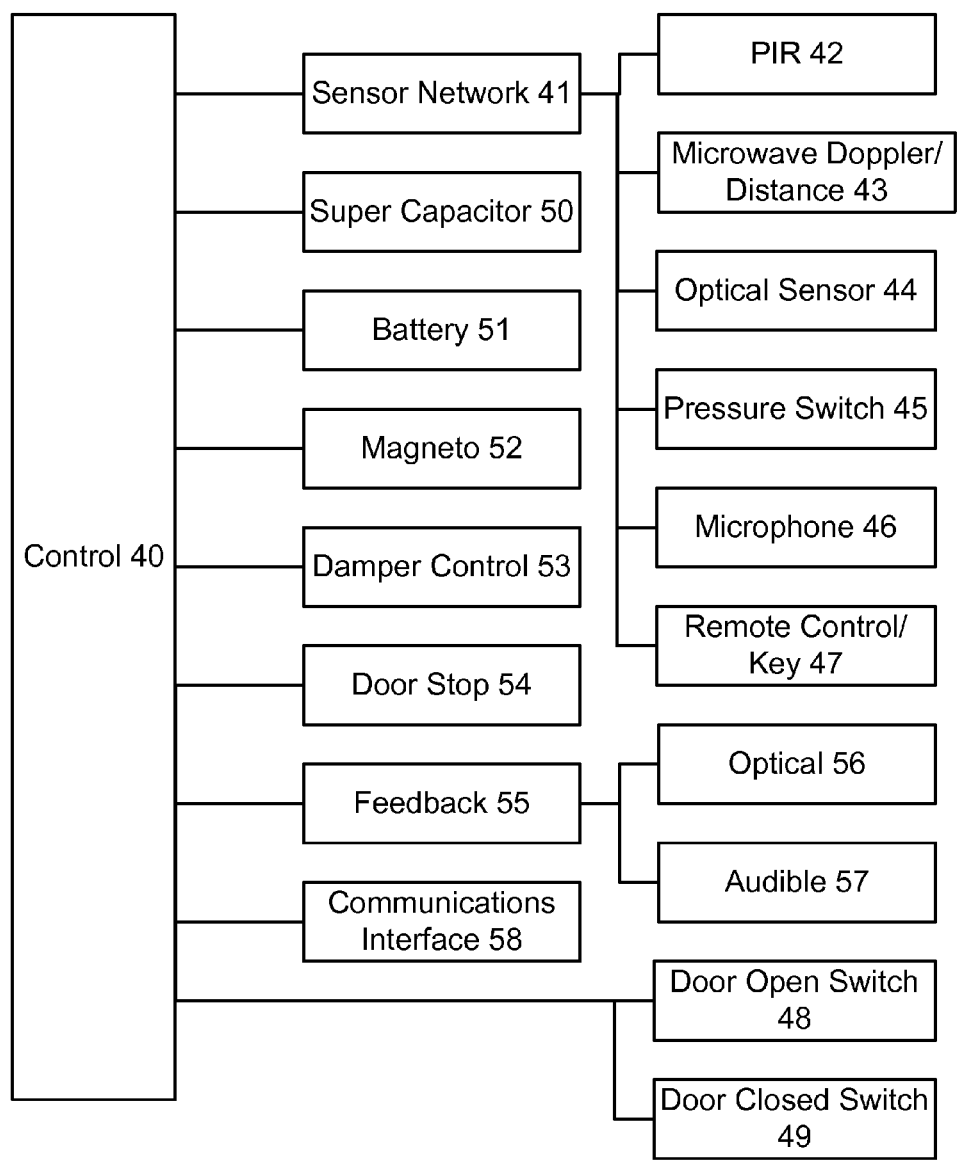
FIG. 4 shows a schematic diagram of a generic control system according to the present invention.

FIG. 4 shows a generic embodiment of a control system, i.e., one which includes a number of optional features, not all of which are provided or necessary in all cases.

A control 40 provides implements the logic necessary for intelligent operation, and is, for example, a microcontroller of known type. Preferably, the microcontroller includes power driver capabilities, minimizing the requirement for external driver circuitry, but is otherwise of a low power design. It is understood, however, that any sort of logic, including discrete devices, various levels of semiconductor integration, or powerful microprocessors, may be used in the control. Further, while it is preferred that the control be included within and integral to the door closing mechanism, it may be provided separately, for example in a sensor housing or as a part of a centralized control system. The control 40 may therefore optionally have a communications interface 58.

The control 40 generally communicates with a sensor network 41, which, as shown in FIG. 4 may include one or more sensors, for example, a PIR sensor 42, a microwave/Doppler sensor 43, optical sensor 44 (imaging or non-imaging), a pressure switch 45 (for example, a door mat or surface on the door 1), a microphone 46, or a remote control/key 47 interface. In the later case, the door closing mechanism may also serve as a lock for the door, or be manually operated or overridden through, for example, an infrared or radio frequency interface. It is noted that this interface may be consolidated with the communications interface 58.

As the door 1 is opened, generally energy is stored for later closing the door 1. The energy storage mechanism also supplies a force which prevents the door from opening rapidly. In a prior art design, this energy storage is typically in a spring or pneumatic chamber. While these are used in various embodiments of the invention, one embodiment of the present invention captures some of the energy supplied during door 1 opening to supply power for control 40 system operation. For example, magneto 52 is rotated during door opening, to supply an electrical charge to super capacitor 50 and/or battery 51. The control 40 may intermediate, for example controlling an electrical impedance of the magneto to damp door 1 motion. The magneto 52 may also be operated as a motor to return the door 1 to the closed position, for example replacing the traditional spring and damper of prior designs.

It is noted that, in order to provide a fail-safe design, the system preferably does not rely on active devices for door 1 closure. Thus, a mechanical or pneumatic spring (not shown in FIG. 4) cooperates with a damper to ensure that the door closes in a predictable and controlled fashion.

A door open switch 48 and door closed switch 49 sensor may be provided. The door closed switch, for example, may be used to turn on and off the system, while the door open switch 49 may be used to control a damping factor of the door 1 through the damping control 53.

When a person or object is detected in the doorway by the sensor network 41, a damper control 53 or door stop 54 (or both) are activated to block or impede door 1 closure. The door remains open until the obstruction is clear, as determined by the sensor network 41, or another condition causes the door to close, for example, a watchdog timer inherent in the control 40 expires (a timeout condition), or a signal is received through the communications interface 58 or remote control/key sensor 47. A feedback system 55 may be provided with audible 57 and/or visible 56 indicators, to indicate the status of the system. For example, low battery, failure (mechanical or electronic), object sensed, timeout, and/or door restraint active.

Figure 5:
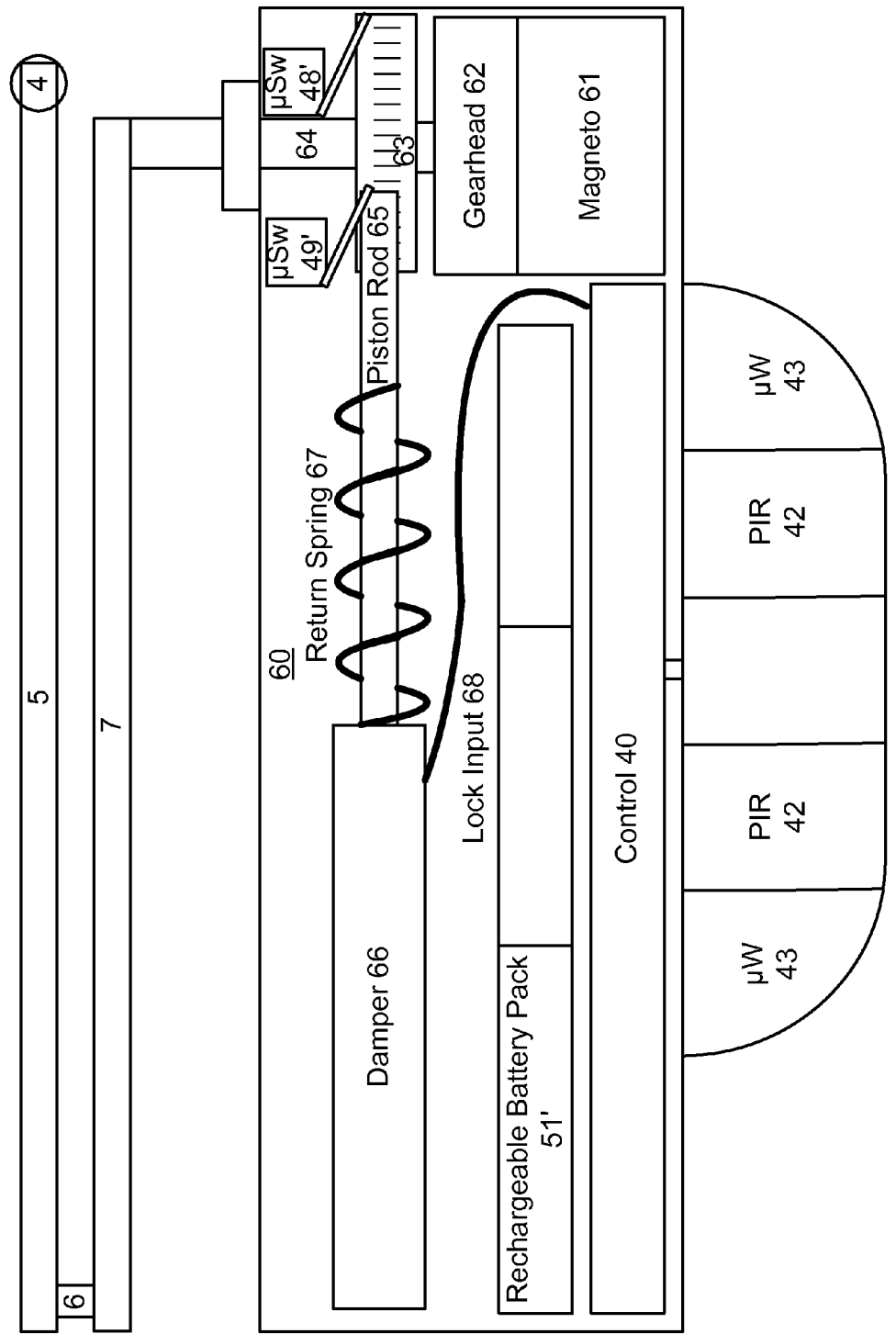
FIG. 5 shows a mechanical configuration of a third embodiment of the present invention.

FIG. 5 shows an embodiment of the invention having a so-called coil-over design damper 66 and spring 67 (the spring 67 may also be housed within the damper 66). In this case, a piston rod 65 has rack gearing on an end portion, and is withdrawn from the damper 66 as the arm 7 is rotated, thus rotating mating gear 63, through connecting shaft 64. Connecting shaft 64 also connects with magneto 61 through a gearhead 62 reducer, such that the magneto 61 produces a usable current for charging a rechargeable battery pack 51' and/or capacitor (not shown). The terminal movement of the piston rod 65 is detected by a set of microswitches 48', 49'. The control 40 receives input from a sensor module including PIR 42 and microwave 43 sensors, which, in this case, are provided on the bottom of the door closing mechanism 8 housing.

Figure 6:
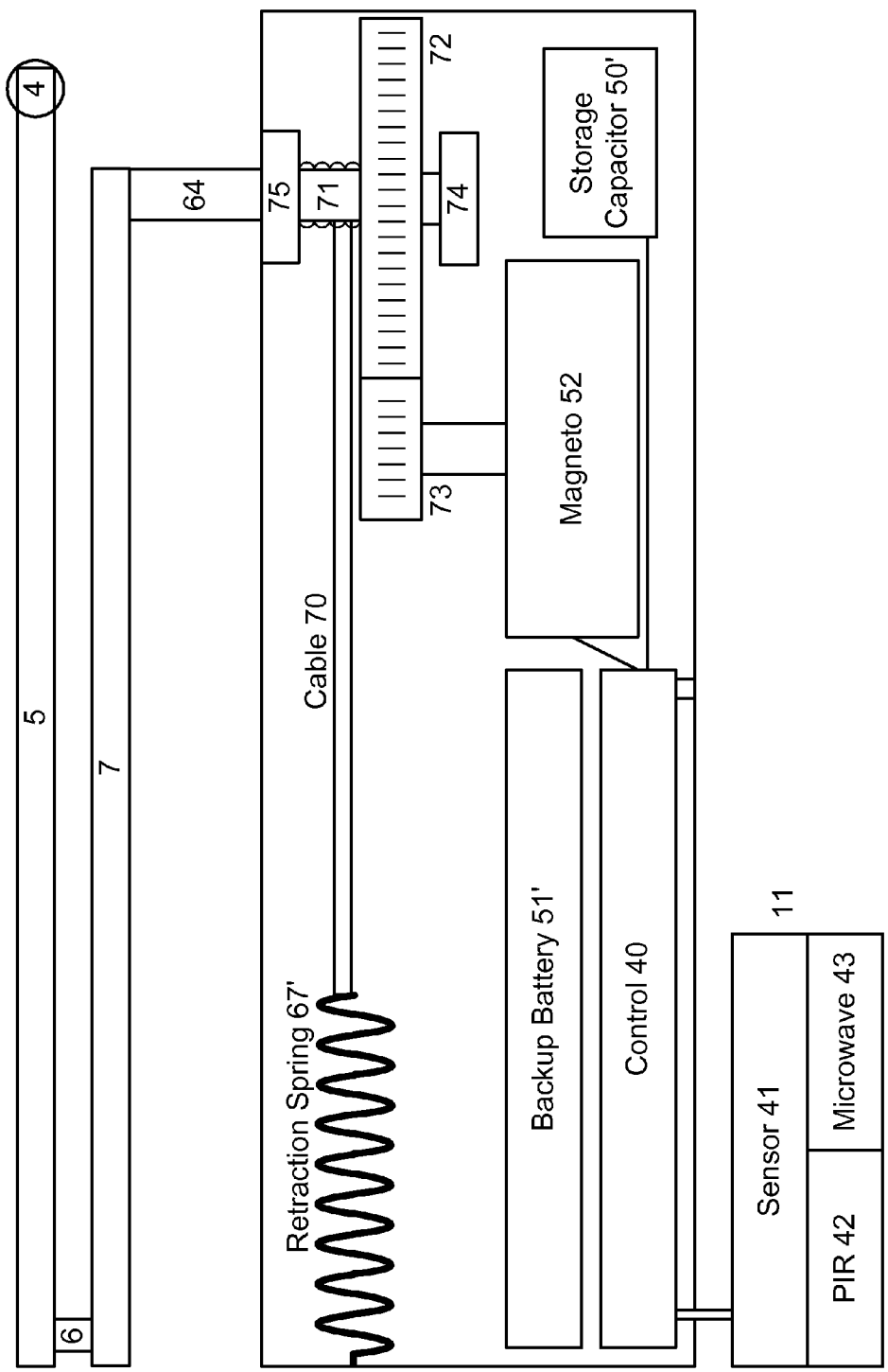
FIG. 6 shows a mechanical configuration of a fourth embodiment of the present invention.

FIG. 6 differs from FIG. 5 in that this embodiment provides electrically controlled damping of the door 1, with mechanical retraction through spring 67', acting through cable 70 and winch 71. Arm 7 acts through shaft 64, mounted on bearings 74, 75, to turn gear 72. Gear 72, in turn, acts on gear 73 to rotate the armature of magneto 52. The electrical energy produced by the magneto 52 is stored in storage capacitor 50' to power the control 40. A backup battery 51' is provided if the power available from the storage capacitor 50' is insufficient. In this case, the sensor housing 11, including the sensor network 41 having PIR sensor 42 and microwave 43 sensor, is shown separated from the door closing mechanism 8 housing.

Figure 7:
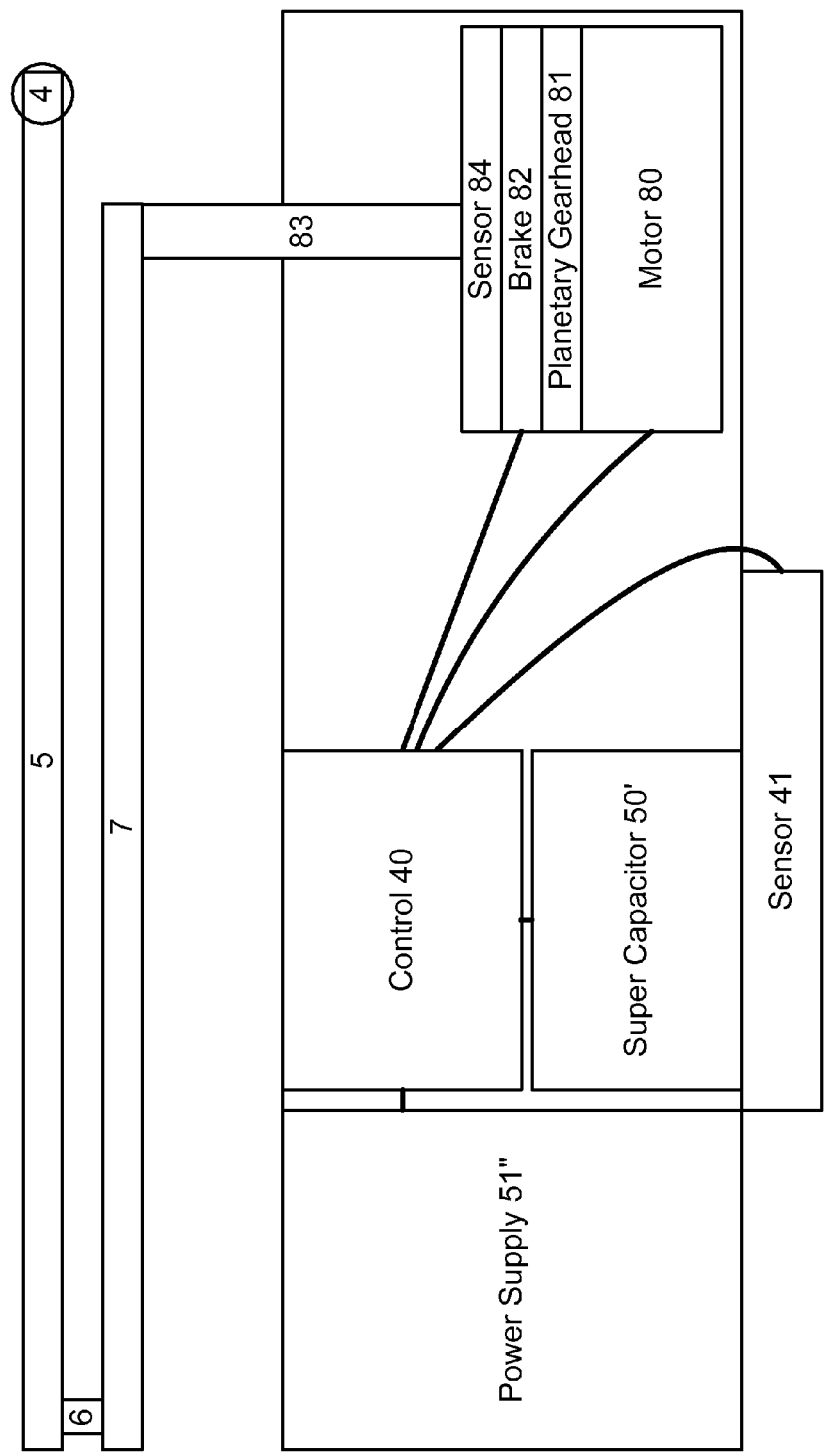
FIG. 7 shows a mechanical configuration of a fifth embodiment of the present invention.

FIG. 7 shows a still different embodiment, wherein arm 7 is rotationally connected to shaft 83, which acts through planetary gearhead 81 with motor 80. A brake 82, and shaft sensor 84 are provided. In this case, a fully active design is provided. The motor 80, during door 1 opening, may act as a generator to charge super capacitor 50', or act as a power assist to open the door. Once the door is open, the brake 82 is engaged, to hold the door in position. When the doorway is clear, the brake 82 is released, and the motor 80 driven to close the door. In this case, the power supply 51" may be a battery or line power. The sensor 84 is used to determine whether the door is being pushed or held open, this providing feedback to prevent the motor 80 from fighting a person manually operating the door. Likewise, the sensor may be used as part of a servo or brushless motor design.

Figure 8:
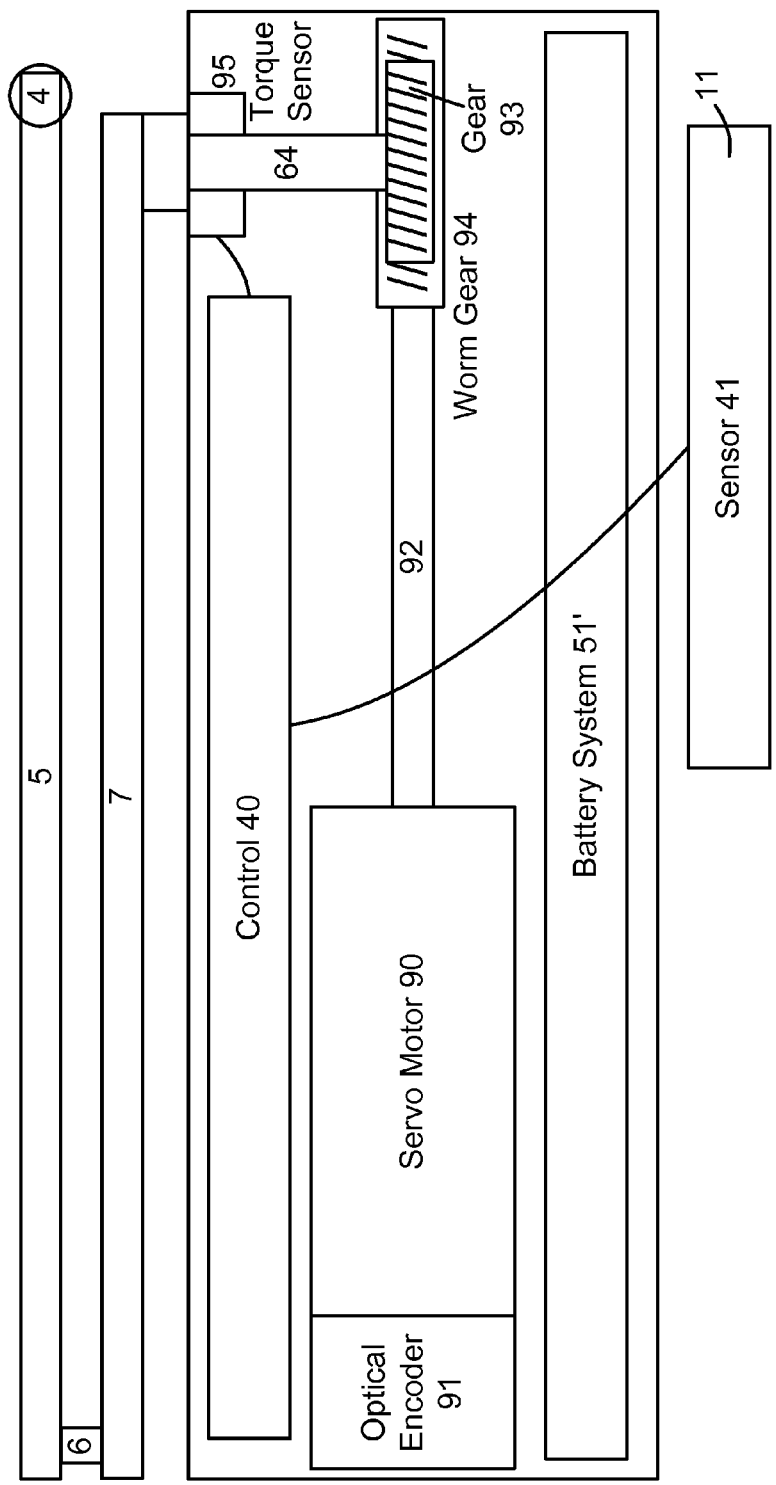
FIG. 8 shows a mechanical configuration of a sixth embodiment of the present invention.

FIG. 8 shows a still further embodiment of the invention. In this case, a servo motor 90, with optical encoder 91, drives shaft 92 with worm gear 94, meshing with gear 93 attached to shaft 64, linked to the arm 7. A torque sensor 95 senses a manual force on the door 1, which is then used by control 40 to drive the servo motor 90. After the force ceases, the control 40 maintains the door 1 in the open position until the doorway is cleared, and then closes the door by rotating the servo motor 90 in the opposite direction. If an obstruction is sensed by the torque sensor, the control stops the door 1 closure. In this case, a battery 51' system or other power supply is necessary, since no energy is stored from door opening. Alternately, an asymmetric drive may be provided, using the servo motor 90 only for door closure, and using a magneto to store energy from door 1 opening.

Figure 9:
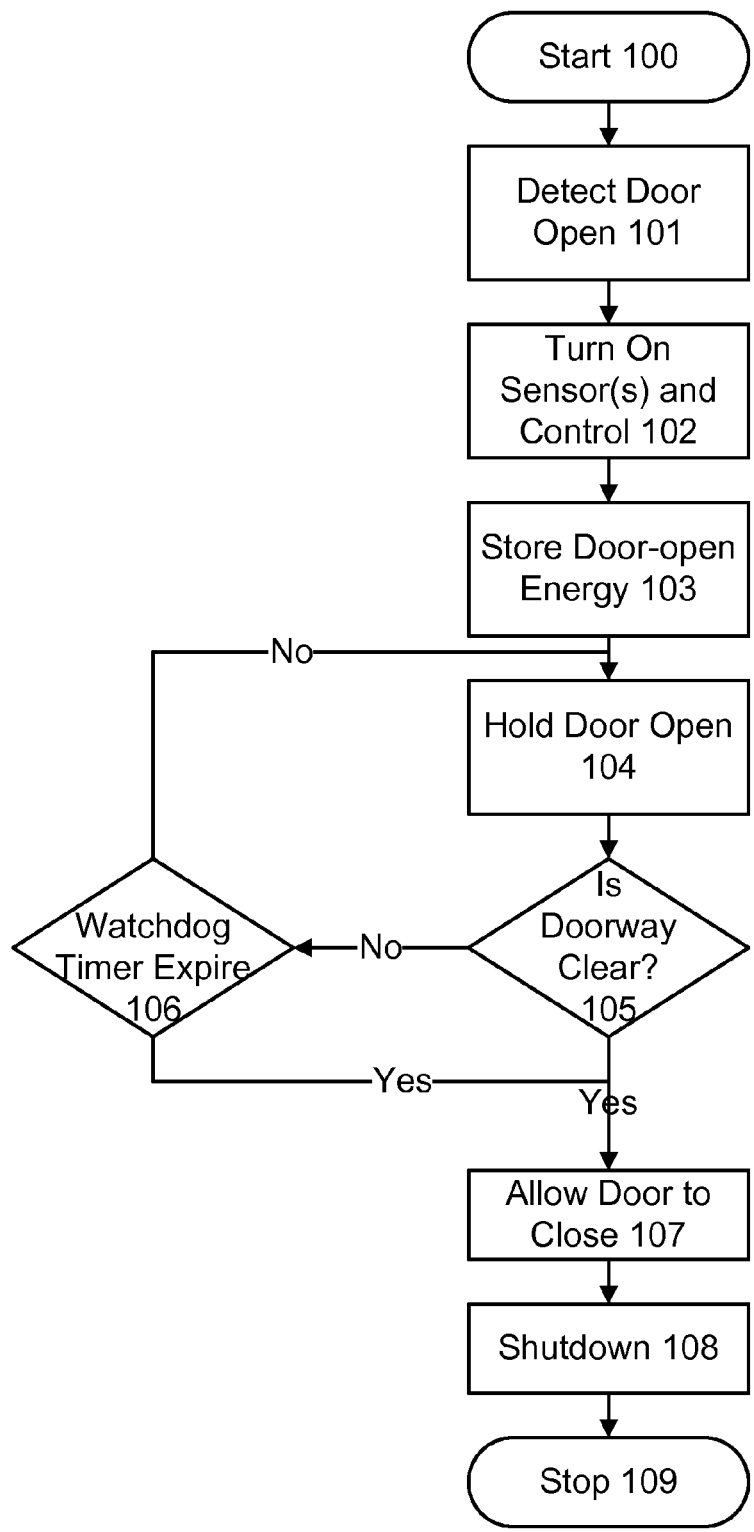
FIG. 9 shows a flow chart of the control system operation according to the present invention.

FIG. 9 shows a flow chart of control 40 system operation. Initial, at start 100, the device is typically powered down. An opening of the door is detected 101, and the sensor(s) and control turned on 102. As the door is opened, energy is stored 103. After the door is opened, it is held open 104. The control then uses the sensor network to determine whether the doorway is clear 105. If it is clear, the door is allowed to close 107, the system shuts down 108, and the process stops 109. If the sensor network does not indicate that the doorway is clear, a watchdog timer is referenced 106, to determine whether a maximum door retention time is exceeded. If it is exceeded, the door is allowed to close 107, preferably with an audible or visual advance warning. If the maximum door retention time is not exceeded, the door is held open 104, and the sensing process is repeated to determine whether the doorway is clear 105. The sensor network 41 may be operative, for example, once per second, to save energy. The maximum door retention time is, for example, 20 seconds.

Figure 10A:
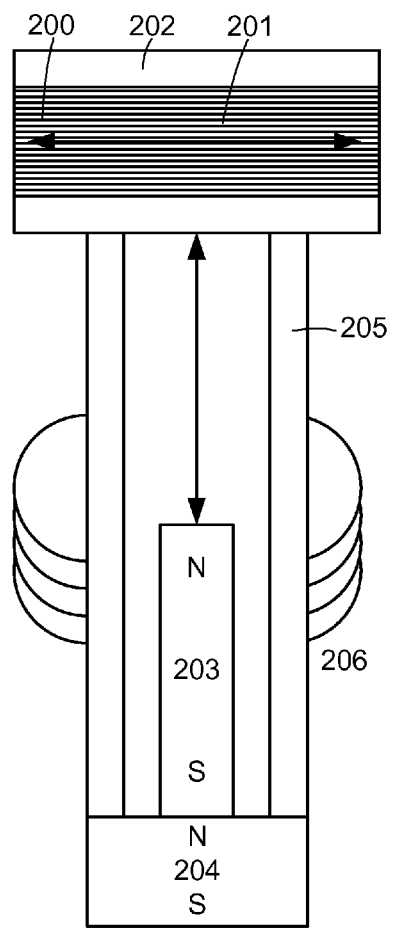
FIGS. 10A and 10B show a detail of a valve in a magnetically controlled damper, in the On and OFF states respectively.
Figure 10B:
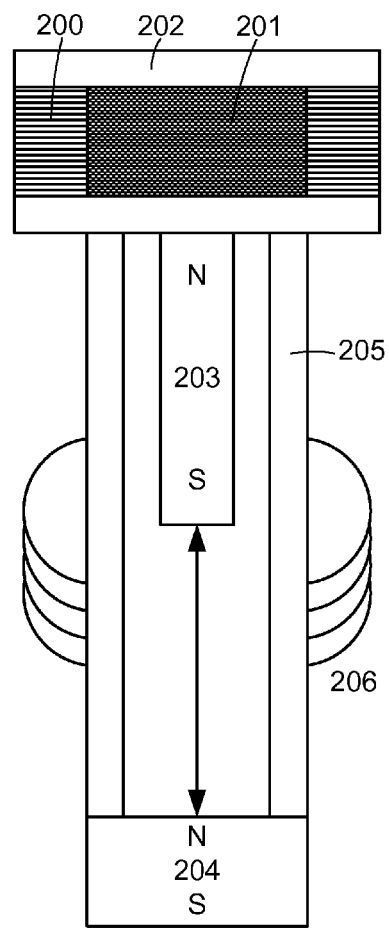

FIGS. 10A and 10B show a valve detail of a magnetically controlled damper according to the present invention. A magnetorheological fluid, for example a magnetic powder suspended in a viscous oil, is provided. During device operation with a low damping coefficient, the fluid 200 flows viscously through a relatively large port 201, within a conduit 202. See, Jolly, Mark (Lord Corporation), "Pneumatic Motion Control Using Magnetorheological Technology", SPIE (2001), expressly incorporated herein by reference. In this case, a displaceable permanent magnet 203 is retained in an ON (flowing) position by a fixed permanent magnet 204 in a guide 205. A coil 206 is activated to produce a magnetic field in the guide, to selectively control displacement of the displaceable permanent magnet 203 away from the fixed permanent magnet 203, toward the conduit 202, which causes an apparent sharp increase in the viscosity of the fluid 200, thereby reducing flow rate in the OFF (non-flowing) state. Thus, fluid flow rate can be simply controlled, with a relatively simple electrically controllable and sealed device. This damper may be used as a primary effector for the control, for example to maintain the door in an open position as the door stop 54, by effectively blocking fluid 200 flow, or as a secondary control over the rate of fluid flow through as the damper control 53, or as both. For example, a spring inserted between the displaceable permanent magnet 203 and the conduit 202 might permit proportional operation.

Figure 11:
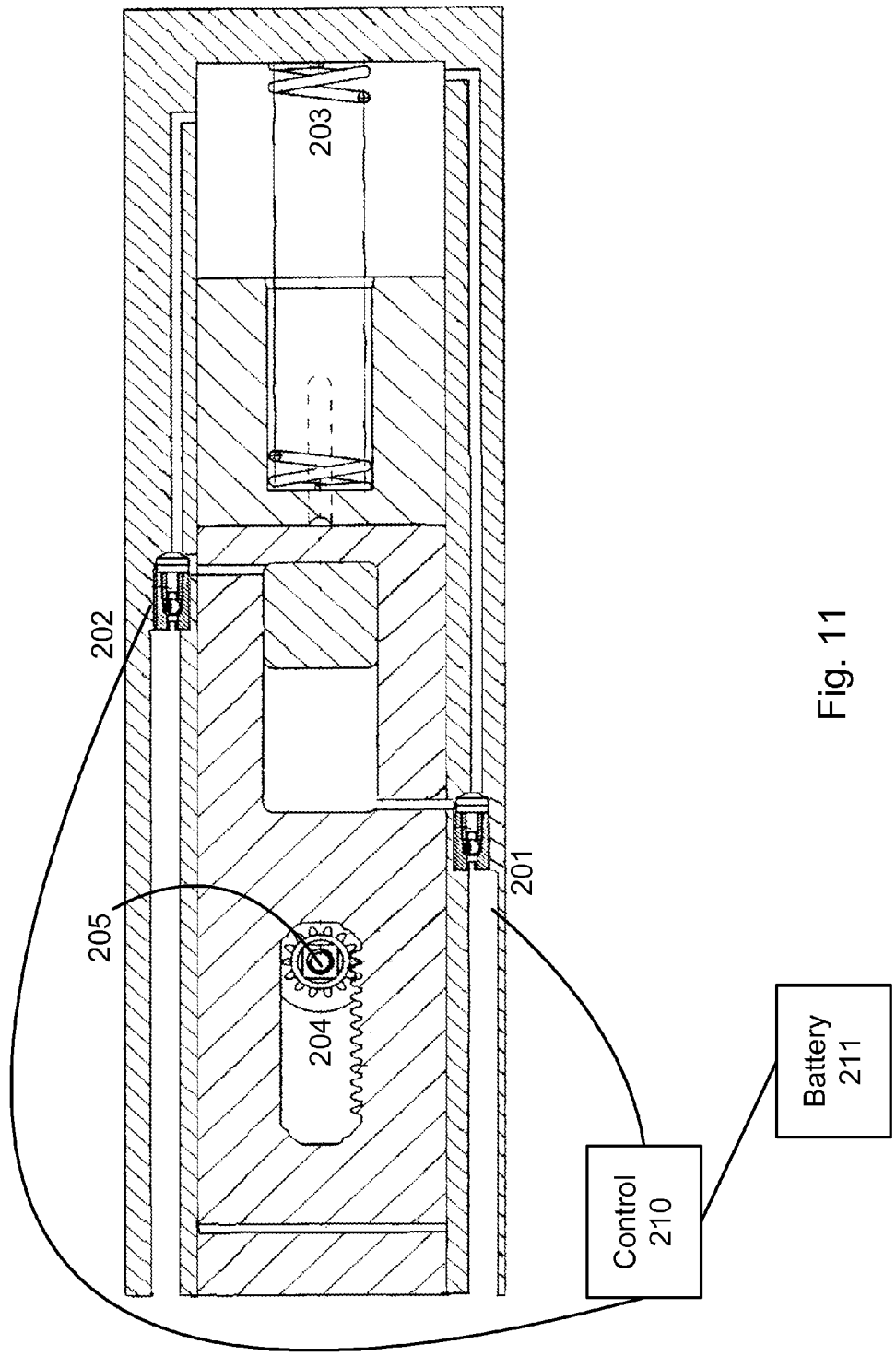
FIG. 11 shows a schematic view of an electronically controlled, hydraulically damped door closer according to the present invention.

FIG. 11 shows a schematic view of a hydraulically damped door closer according to the present invention. Typical commercial door closers for sale in the U.S Domestic market are of two types: those for fire doors, which are generally rated by Underwriters Laboratories (UL), and which have no means for locking the door in an open position, and unrated door closers for applications in which fire codes and the risk of fire hazard in the event that the door is held open is not a substantial issue. See, for example, Ryobi 8800 Series, D1550 Series, D2100 Series, D3550 Series, Sargent Bradford Series. In order to provide an efficient design, the two type of door closers generally share common parts, and for example, have a different arm (called a hold-open arm) for the unrated application. On the other hand, some door closers have an internal hold-open, as an option for the main body of the closer. The hold open feature not only poses a fire hazard under various circumstances, but also defeats a number of advantages of the presence of a door closer.

Many hydraulically damped door closers for commercial application have three (or more) adjustments; a first setting 201 for adjusting the initial door closure rate, a second adjustment 202 for setting a mid-swing door closure rate, and a backcheck adjustment. The door closure rate settings are established by a set of screw adjustable bleed valves. The initial door closure rate is typically higher than the mid-swing rate, so in order to maintain the door in an open condition, all bleed valves would have to be blocked. (In order to provide a fail-safe mode, the minimum door closure rate may be set at a very slow rate, such as 1-5 minutes, instead of locked.) Therefore, the present invention provides a hydraulically damped door closer which provides one or more electronically controlled bleed valves (which may be mechanically adjusted to control respective closure rates). These valves may be linear solenoids (latching or non-latching) 201, 202, or rotary valves. In a held-open condition, a solenoid is activated to maintain the door in an open position by blocking flow of hydraulic fluid through the orifice. In a closure condition, the hydraulic fluid flows according to the normal arrangement of passages. Generally, door opening bypasses the damping mechanism and transfers energy to a spring 203.

According to the present invention, the electronic control therefore bypasses or supplements the relatively simple "hydraulic logic" to provide a higher intelligence.

Examples of this intelligence include object sensing in a doorway, fire or smoke detection (and therefore door closure and/or alarm), remote activation, room occupancy sensing, and the like. In a first embodiment, a spring biased solenoid actuator is linked to a needle which controls flow through a restricting orifice 201, 202. The control 210 holds the actuator 201, 202 in the active and therefore hold-open state for so long as an object is in the doorway, or other condition exists for which the door should be held open. This method is fail safe, since a battery failure would result in default hydraulic door closure. A control 210 failure which activates the solenoid actuator 201, 202 would likely drain the battery 211 over a few hours. Thus, a fire safety rating or special exemption may likely be obtained. Since power is required to maintain the solenoid actuator 201, 202 in an activated state, a magneto generator 204 driven by the door opening through gear 205 is preferred.

In a second embodiment, the actuator employs a latching armature. In this case, it is possible for the battery to fail with the unit held in the open position; therefore this embodiment generally includes a base bleed which causes the door to close within 1-5 minutes, and so provide a graceful and fail safe mode. This type of system may have lower battery drain than a system in which continuous power is required to restrain door closure.

Figure 12:
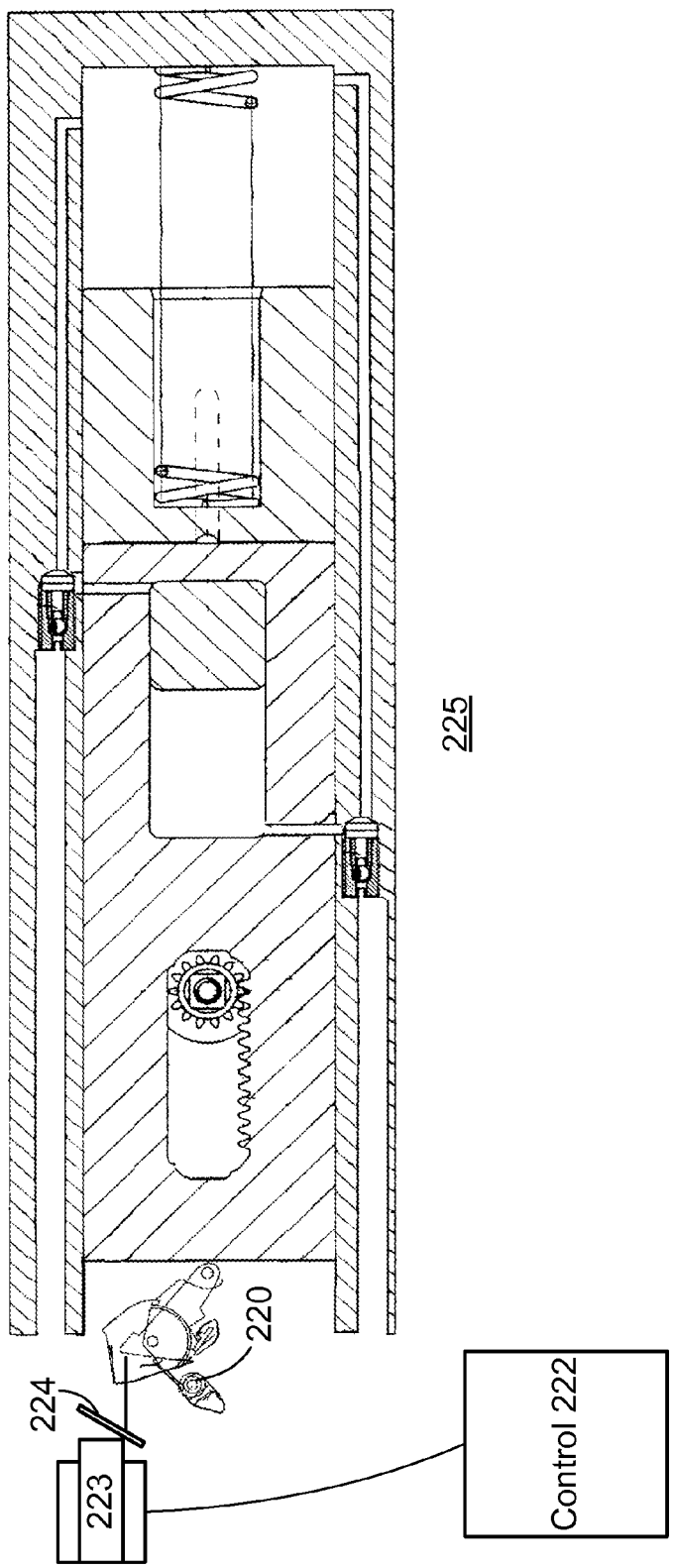
FIG. 12 shows a schematic view of a hydraulically damped door closer with an intelligent hold-open device according to the present invention.

In a third embodiment, shown in FIG. 12, a collapsible mechanical toggle linkage 220 is reset each time the door is opened by extension of a moveable member 221 within the door closer. See, U.S. Pat. No. 6,031,438, expressly incorporated herein by reference. The control 222 then generates a signal which activates a solenoid 223 which pulls an armature 224, which displaces a seer pin (not shown in FIG. 12) and collapses the toggle linkage 220 when the door closure is to be activated, which allows the normal hydraulic door closure mechanism 225 to operate. In this case, only a single actuator pulse is required to close the door. On the other hand, this acts as an automatic hold-open, and thus would likely be applicable especially for non-fire safety rated operation.

As can be seen, the control 222 may receive, for example, an external signal to trigger door closure, such as a fire alarm or a timer. A manual reset may also be provided to trigger the door closure in case of control 222 failure. The door closer may also include a variety of sensors and/or sensor inputs, of particular importance being a fire and/or smoke detector, or remote indication of such conditions. A remote communication may take place by means of wires, radio frequency, audio signals, infrared, optical signals or the like. Thus, the door closer may watch or listen for activation of proximate fire alarms, and thus need not be permanently wired. Typically, this design will also incorporate an object or person sensor in accordance with the above examples, but need not.

It is noted that while hydraulic damping is preferred, other damping means may be provided, especially if electronically controlled. In particular, a magneto which spins during door closure (and possibly opening), having a controllable (or fixed) load, would damp closure. Likewise, a magnetically activated clutch (linear or rotary) could be controlled to regulate closure speed, and effect damping.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. An apparatus comprising:
   (a) a device configured to store energy during opening of a hinged door comprising a spring which acts on a piston to pressurize a fluid, and to use the stored energy to apply a force to close the hinged door by displacement of a member along a path;
   (b) a damping system configured to damp a closure of the hinged door against the applied force;
   (c) a non-contact sensor configured to be mountable near a top of a door frame for the hinged door proximate to the device and the damping system, and to produce a sensor signal indicating a detection of a human proximate to either side of a doorway;
   (d) an actuator comprising a selectively controllable hydraulic valve configured to brake a displacement of the member by restricting a flow of the pressurized fluid through the hydraulic valve, to selectively hold the hinged door in an arbitrary open position, and restrain the energy storage device from releasing stored energy by braking the displacement of the member along the path to close the hinged door and to selectively release restraint of the energy storage device to permit displacement of the member along the path, to permit closing of the hinged door, substantially without providing a force capable of opening the hinged door; and
   (e) an automated control system for controlling the actuator based on the sensor signal,
   wherein the automated control system is fail safe with respect to loss of power to the automated control system to permit the hinged door to close, and has a first mode of operation in which the device is controlled to selectively hold the hinged door in the arbitrary open position, when the sensor signal indicates detection of the person within the doorway, and a second mode of operation in which the device is controlled to selectively permit closure of the hinged door when the sensor signal indicates lack of detection of the human within the doorway.

2. An apparatus, comprising:
   (a) a device configured to apply a closing force to displace a member to close a hinged door at a portal, said closing force being derived from an opening force employed to open the hinged door at the portal, in comprising an energy storage device having a compressible spring which compresses in response to the opening force to store energy, and which acts on a piston to pressurize a fluid, wherein external energy is not required to close the portal;
   (b) a damper configured to damp a closure of the hinged door at the portal;
   (c) a non-contact sensor configured to be mountable near a top of a door frame for the hinged door at the portal proximate to the device, and to produce a sensor signal representing a human proximate to either side of the portal;
   (d) an actuator comprising a selectively controllable hydraulic valve configured to brake a movement of the member to selectively hold the hinged door in an arbitrary open position, by selectively restricting a flow of the pressurized fluid through the hydraulic valve, substantially without providing a force capable of opening the hinged door, and to selectively release the braking of the movement of the member to permit closure of the hinged door at the portal; and
   (e) an automated control, configured to receive the sensor signal to control said actuator,
   wherein the automated control system is fail safe with respect to loss of power to the automated control to permit the hinged door to close, and has a first mode of operation in which the actuator is controlled to selectively hold the hinged door in the arbitrary open position when the sensor signal indicates the human proximate to either side of the portal, and a second mode of operation in which the actuator is controlled to selectively release the hold of the hinged door to selectively permit closure when the sensor signal indicates lack of the human proximate to either side of the portal.

3. The apparatus according to claim 2, wherein the sensor signal is received from at least one of an infrared sensor and an optical sensor.

4. The apparatus according to claim 2, wherein the sensor is an imaging sensor.

5. The apparatus according to claim 2, wherein the sensor is a motion sensor, wherein the sensor is a microwave sensor selectively responsive to a movement of the human proximate to the portal.

6. The apparatus according to claim 2, further comprising a housing, wherein the device, the actuator and the automated control are completely housed within the housing.

7. The apparatus according to claim 2, further comprising a feedback system, wherein the user feedback system is configured to provide visual feedback to the human.

8. The apparatus according to claim 2, further comprising a communications network interface configured to communicate with an external system, wherein the communications network interface communicates at least one of the sensor signal, a signal indicating a state of the automated control, and a signal for controlling an operation of the automated control.

9. A method for controlling a door closer apparatus, said apparatus comprising:
   a device for applying a closing force through a displaceable element to close a hinged door at a portal, the closing force being derived from energy derived from an opening force employed to open the hinged door at the portal comprising a spring which acts on a piston to pressurize a fluid, such that external energy is not required to subsequently close the hinged door at the portal;
   a damping system configured to damp a closure of the hinged door against the closing force;
   a non-contact sensor configured to be mountable near a top of the portal proximate to the device, and to produce a sensor signal indicating presence of a human proximate to either side of the portal;
   an actuator, comprising a selectively controllable hydraulic valve configured to brake a displacement of the displaceable element by restricting a flow of the pressurized fluid through the hydraulic valve, substantially without providing a force capable of opening the hinged door, responsive to a control signal, for selectively latching a displacement of the displaceable element to hold the hinged door at the portal in an arbitrary open position in an open state and for selectively unlatching the displacement to release the hinged door at the portal to permit closure of the hinged door damped by the damping system; and
   an automated control, receiving the sensor signal from the sensor and controlling the actuator by producing the control signal, the door closer apparatus being fail-safe with respect to at least a loss of power to the automated control, permitting the hinged door to close after a predetermined period,
   said method comprising:
   opening the hinged door at the portal against the closing force, and storing potential energy from the opening of the hinged door at the portal in the spring;
   sensing a human proximate to the portal with the sensor and producing the sensor signal;
   providing a first mode of operation, wherein the automated control provides the control signal in a first state to the actuator if the human is sensed proximate to the portal, latching the displacement of the displaceable element by restricting the flow of the pressurized fluid through the hydraulic valve and thereby restraining closure of hinged door at the portal, and maintaining the potential energy in the spring; and
   providing a second mode of operation, wherein the automated control provides the control signal in a second state to the actuator if the human is not sensed proximate to the portal or in a fail-safe event, unlatching the displacement of the displaceable element by relaxing the restriction of the flow of pressurized fluid through the hydraulic valve and permitting displacement of the displaceable element in response to the closing force, to permit closure of the hinged door at the portal by expending at least a portion of the potential energy stored in the spring.

10. The method according to claim 9, further comprising providing a third mode of operation to override the first mode of operation to permit closure of the portal even if the object is sensed.

11. The method according to claim 10, wherein the third mode of operation is fail safe with respect to a failure of the automated control when receiving power to correctly generate the control signal in at least the second state during the second mode of operation.

12. The method according to claim 9, further comprising providing a fourth mode of operation to override the second mode of operation to prevent closure of the portal even if the object is not sensed.

13. The method according to claim 9, wherein the device comprises a fluid reservoir containing a hydraulic fluid, having a first portion pressurized by the spring based on the opening force, a second portion having a pressure less than a pressure of the first portion, and the selectively controllable hydraulic valve comprises a solenoid valve.

14. The method according to claim 9, wherein the actuator comprises a magnetically operated device which selectively modifies a magnetic field in response to the control signal from the automated control.

15. The method according to claim 9, further comprising a smoke detector which causes a closure of the hinged door upon detection of smoke.

16. The method according to claim 9, wherein the sensor is an optical sensor.

17. The method according to claim 9, wherein automated control receives a further communicates with an automated communication network to receive a signal to permit closure of the hinged door at the portal independent of the sensor signal.

* * * * *